April 13, 1965  H. F. ANSPACH  3,177,629
APPARATUS FOR LOADING COMPONENTS
Filed Oct. 3, 1961  24 Sheets-Sheet 1

INVENTOR
H.F. ANSPACH
By W.J. Johnson
ATTORNEY

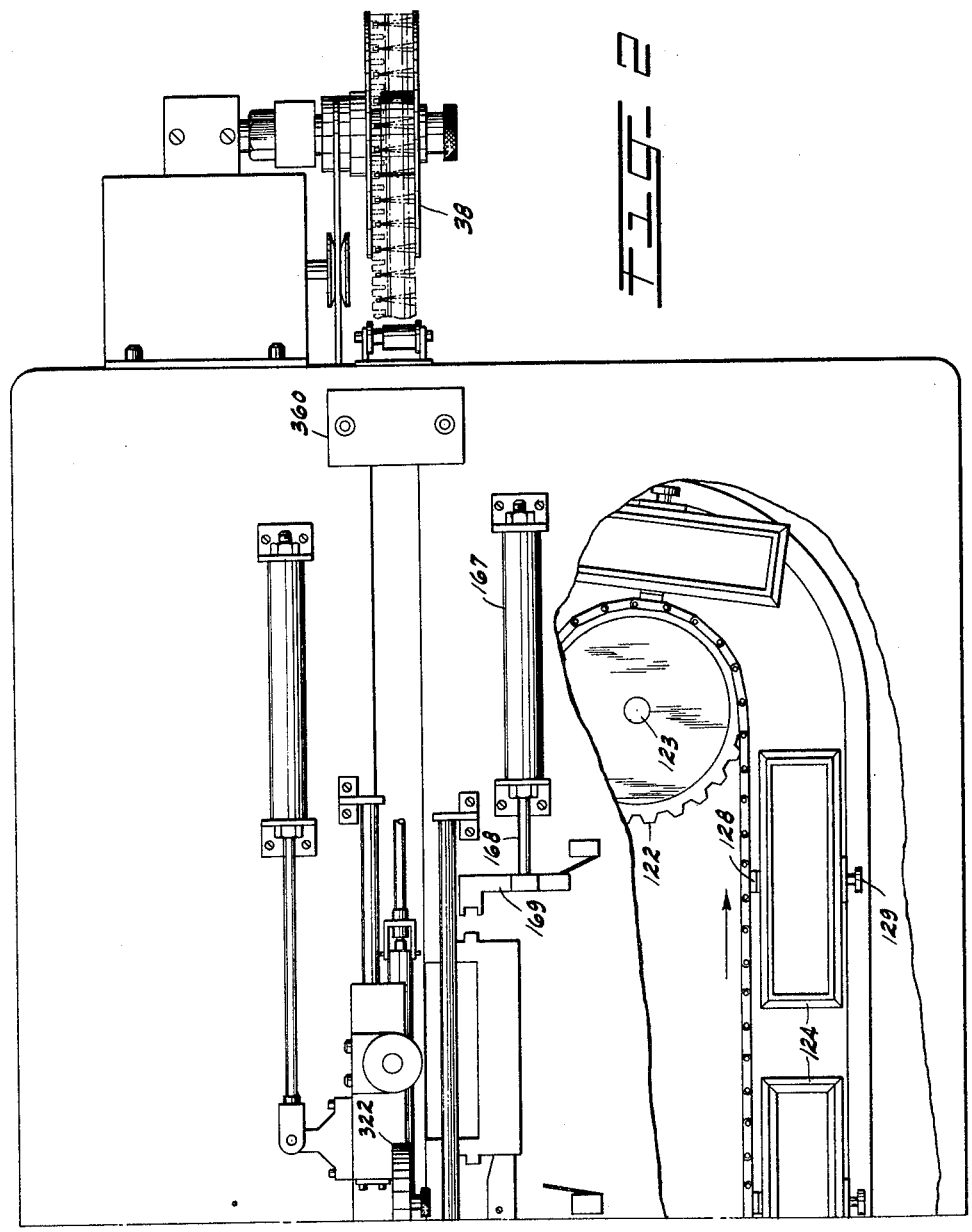

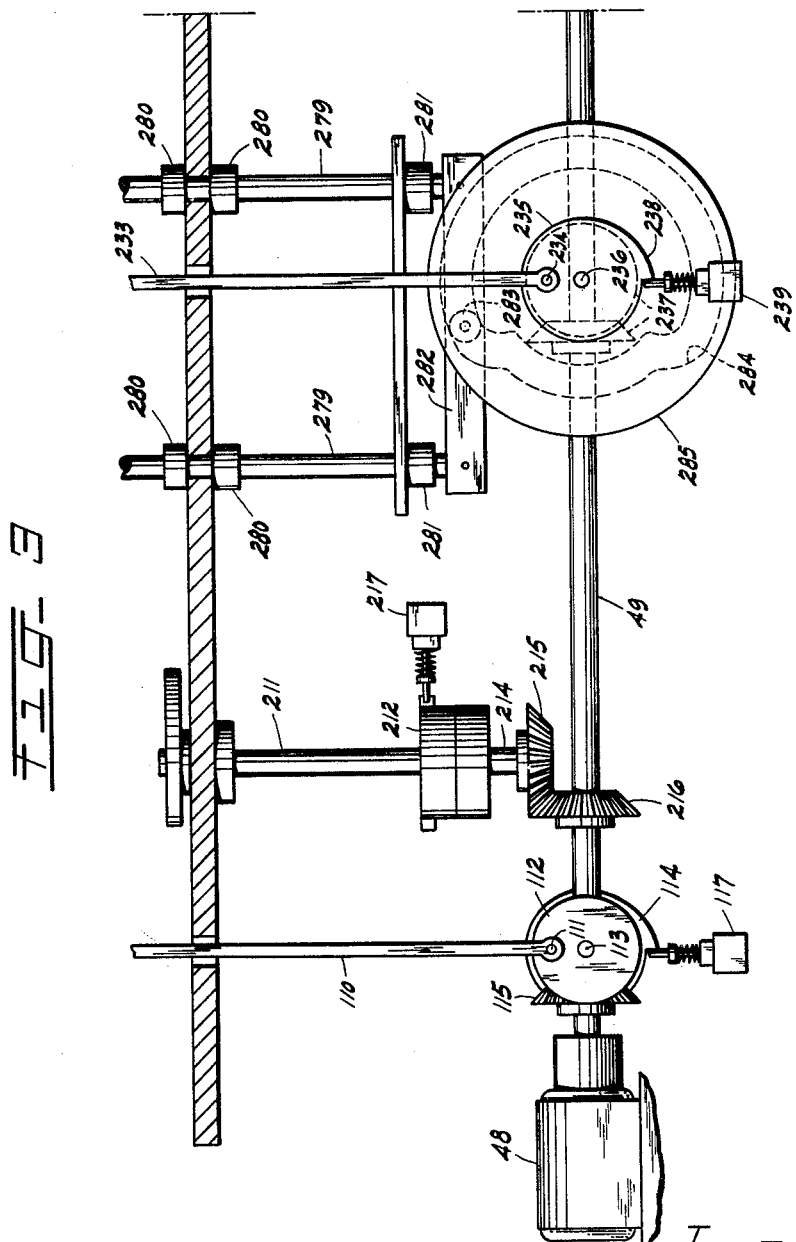

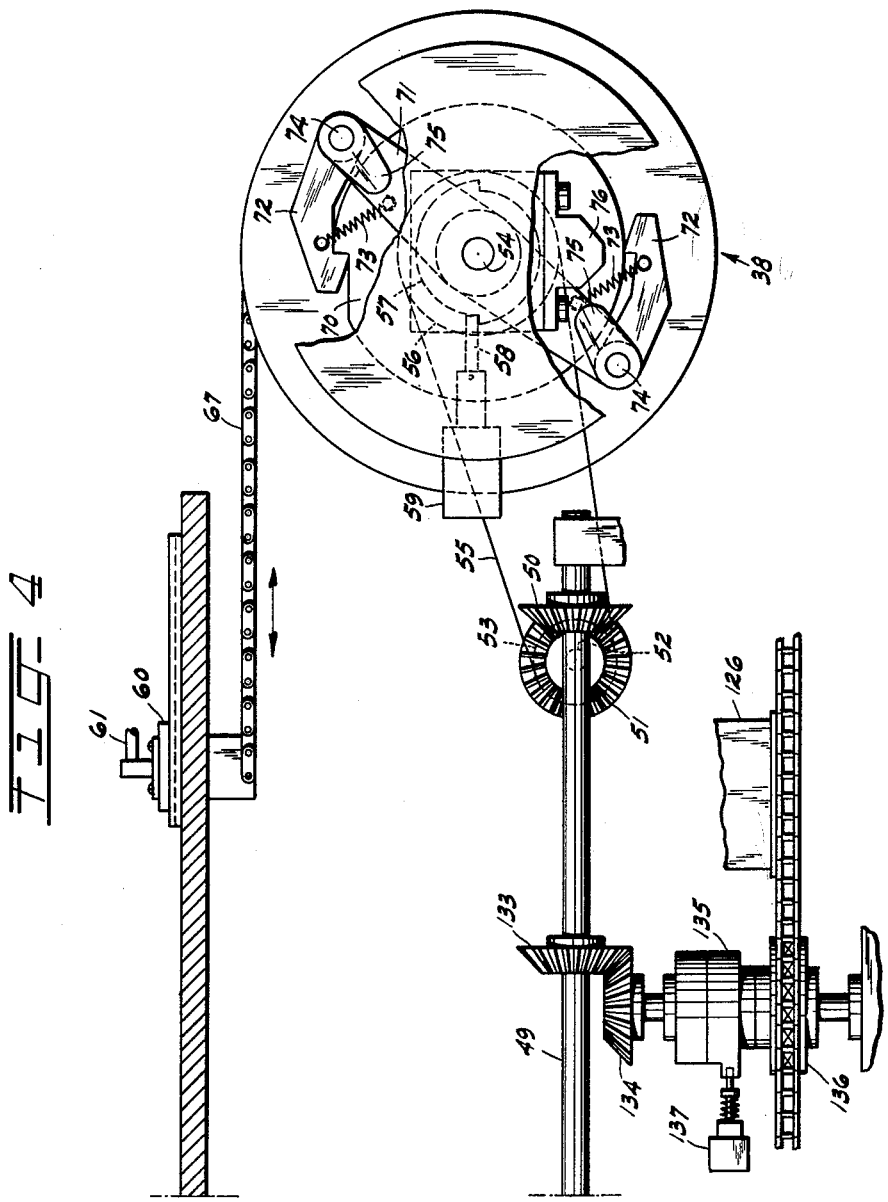

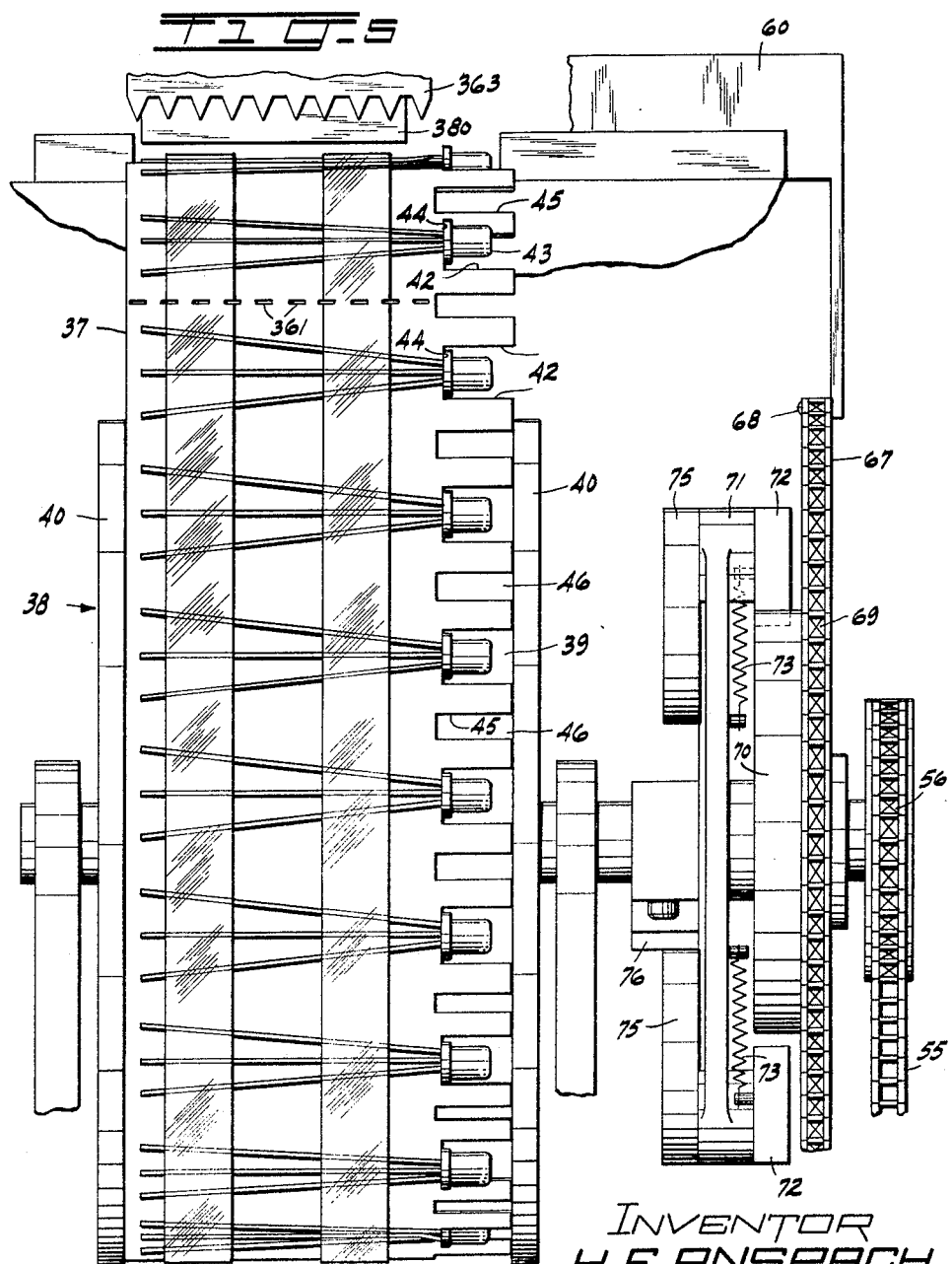

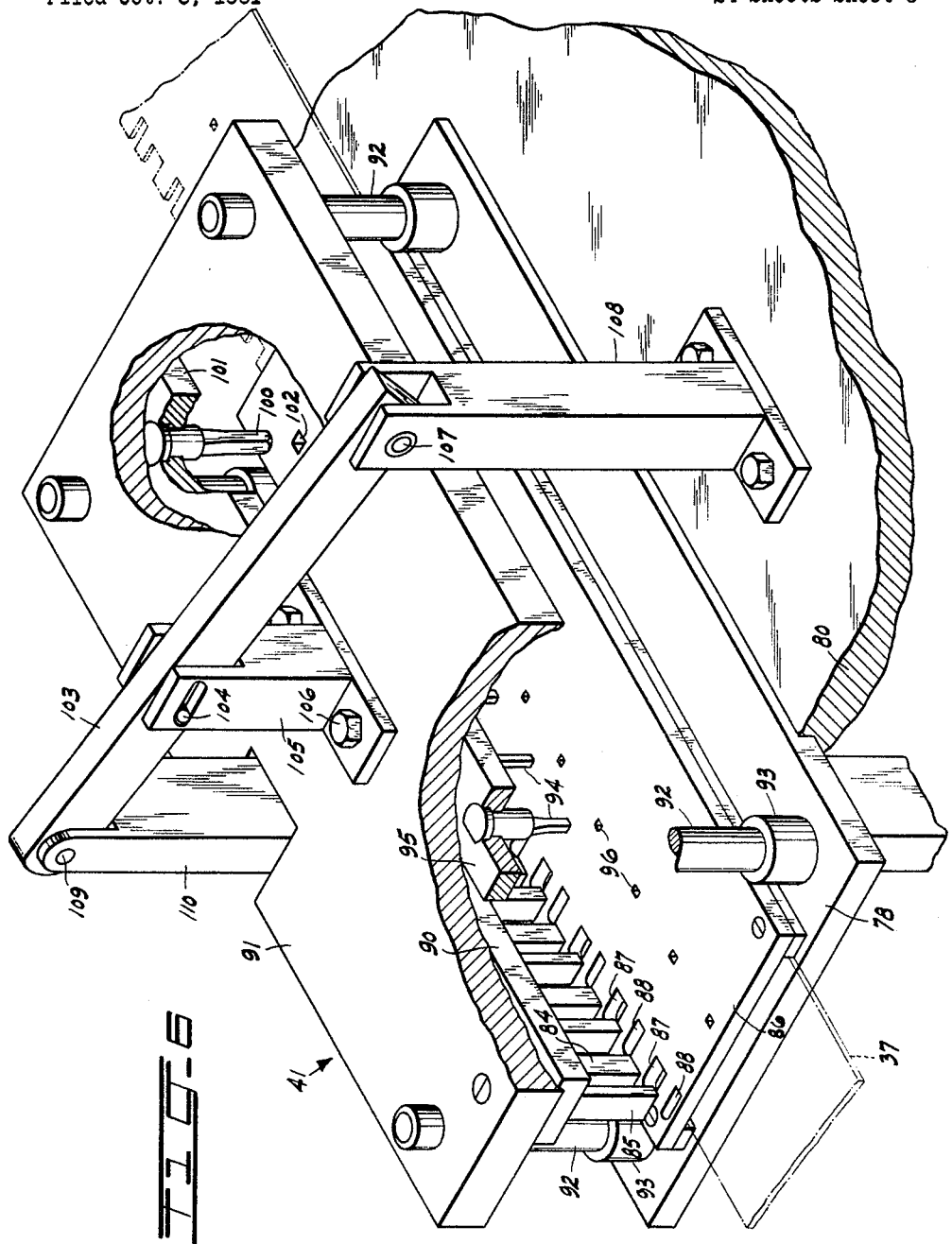

April 13, 1965  H. F. ANSPACH  3,177,629
APPARATUS FOR LOADING COMPONENTS
Filed Oct. 3, 1961  24 Sheets-Sheet 7
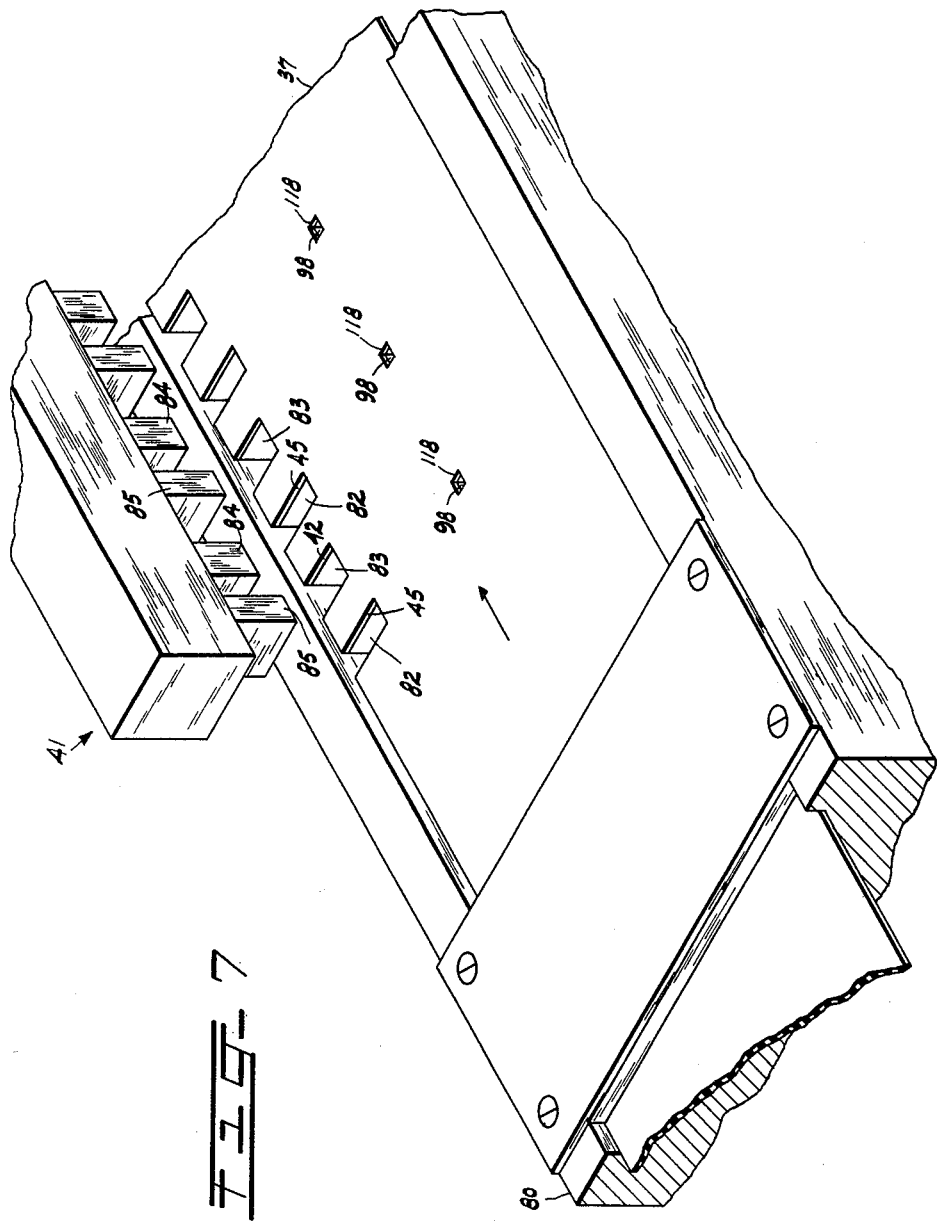
INVENTOR
H. F. ANSPACH
By W. R. Johnson
ATTORNEY

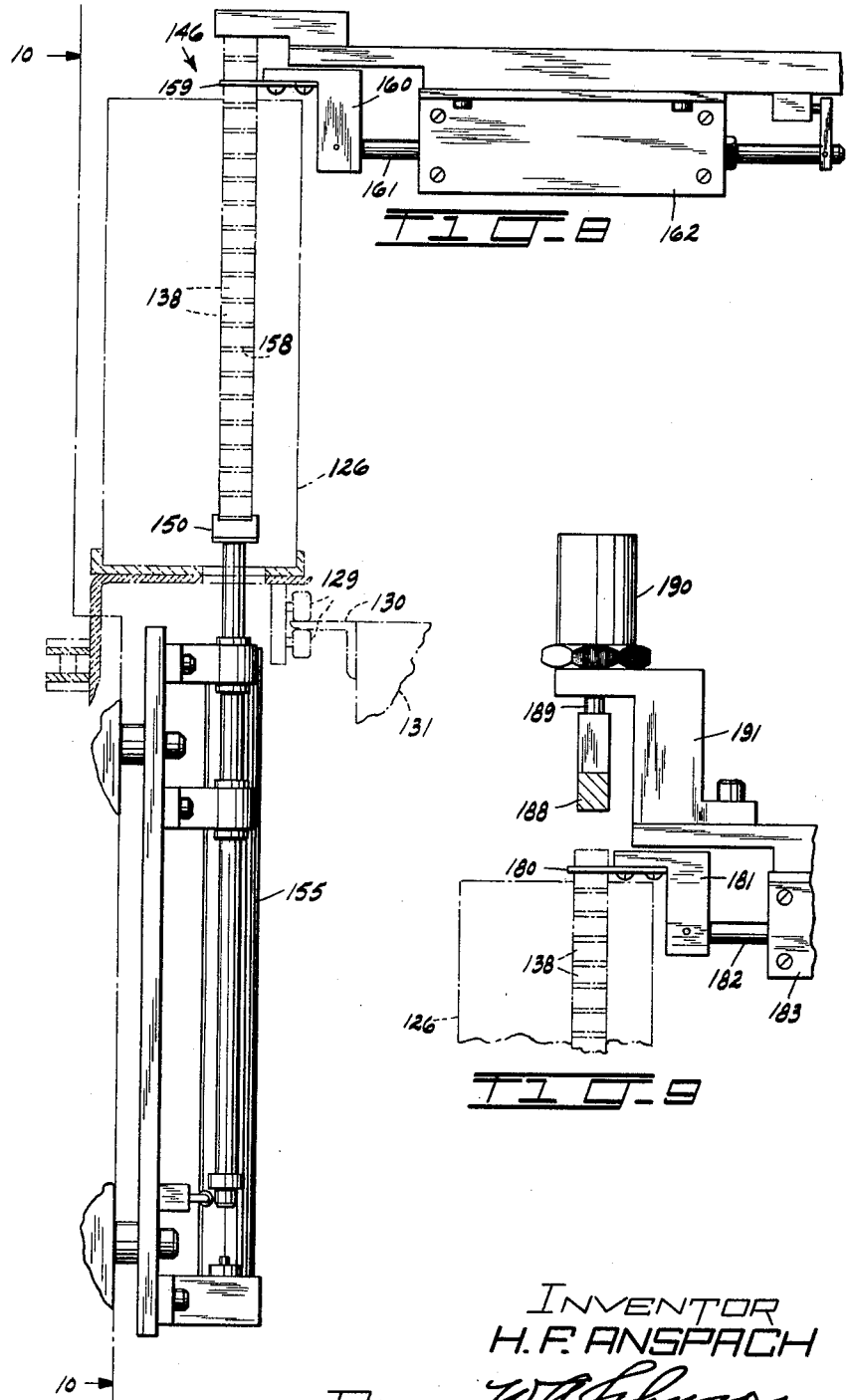

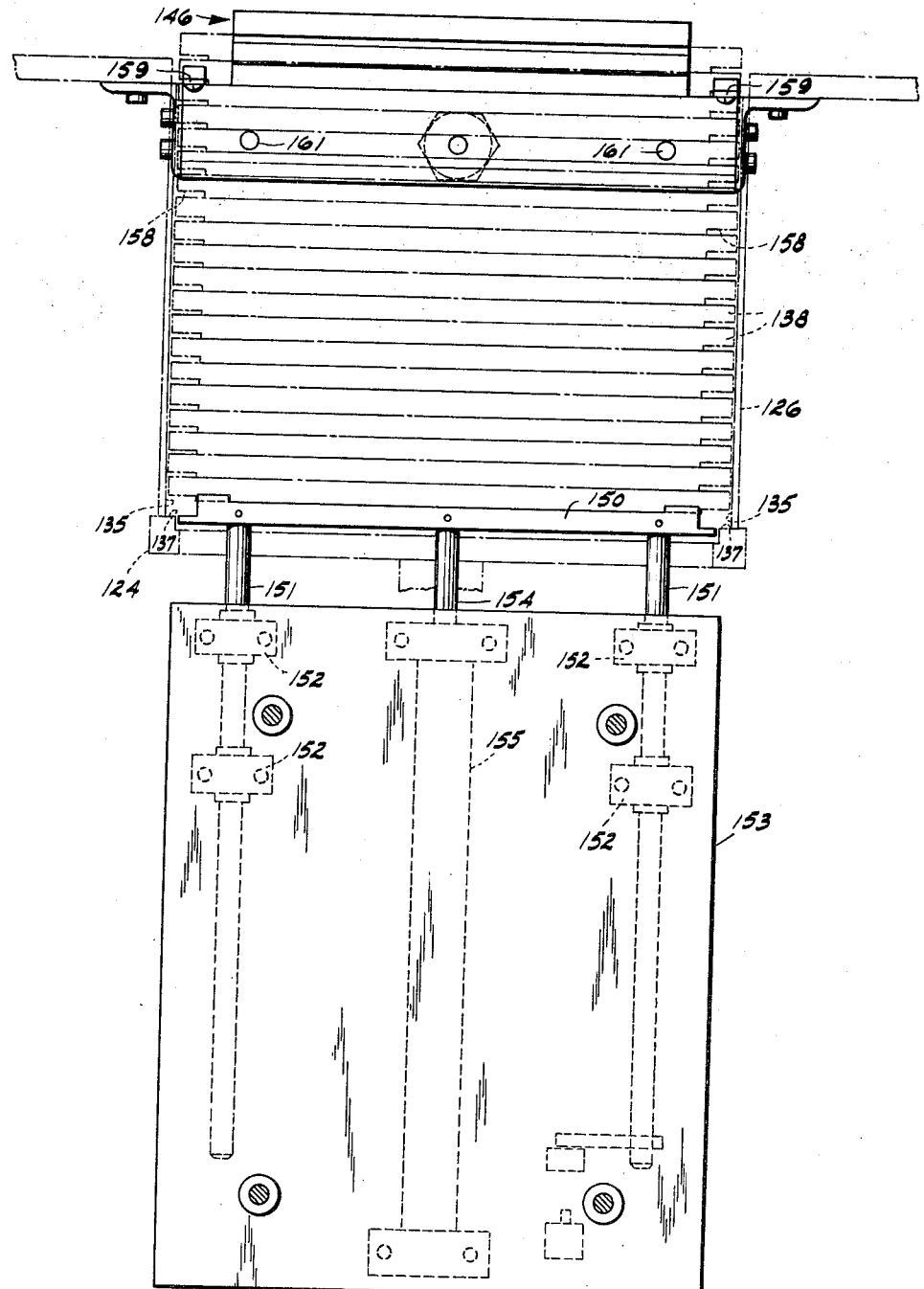

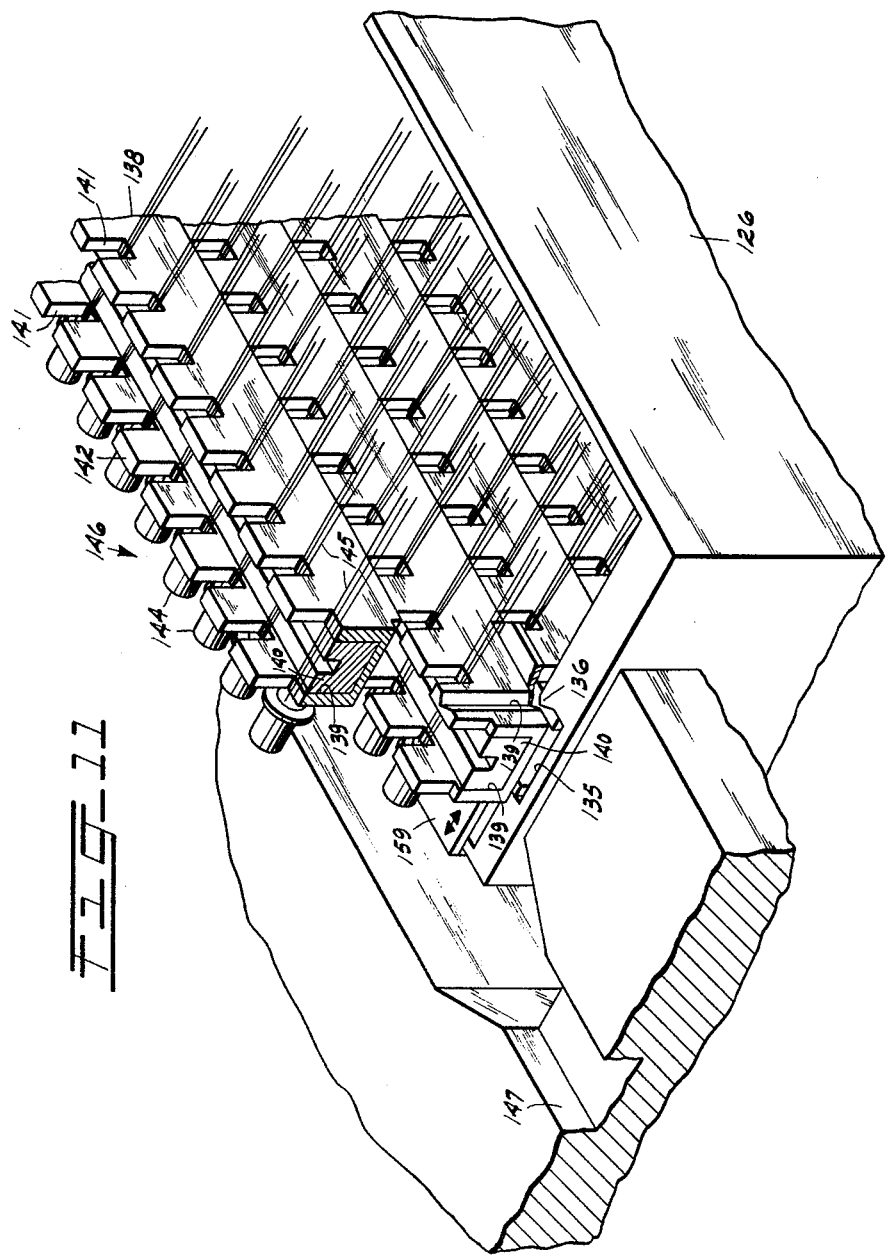

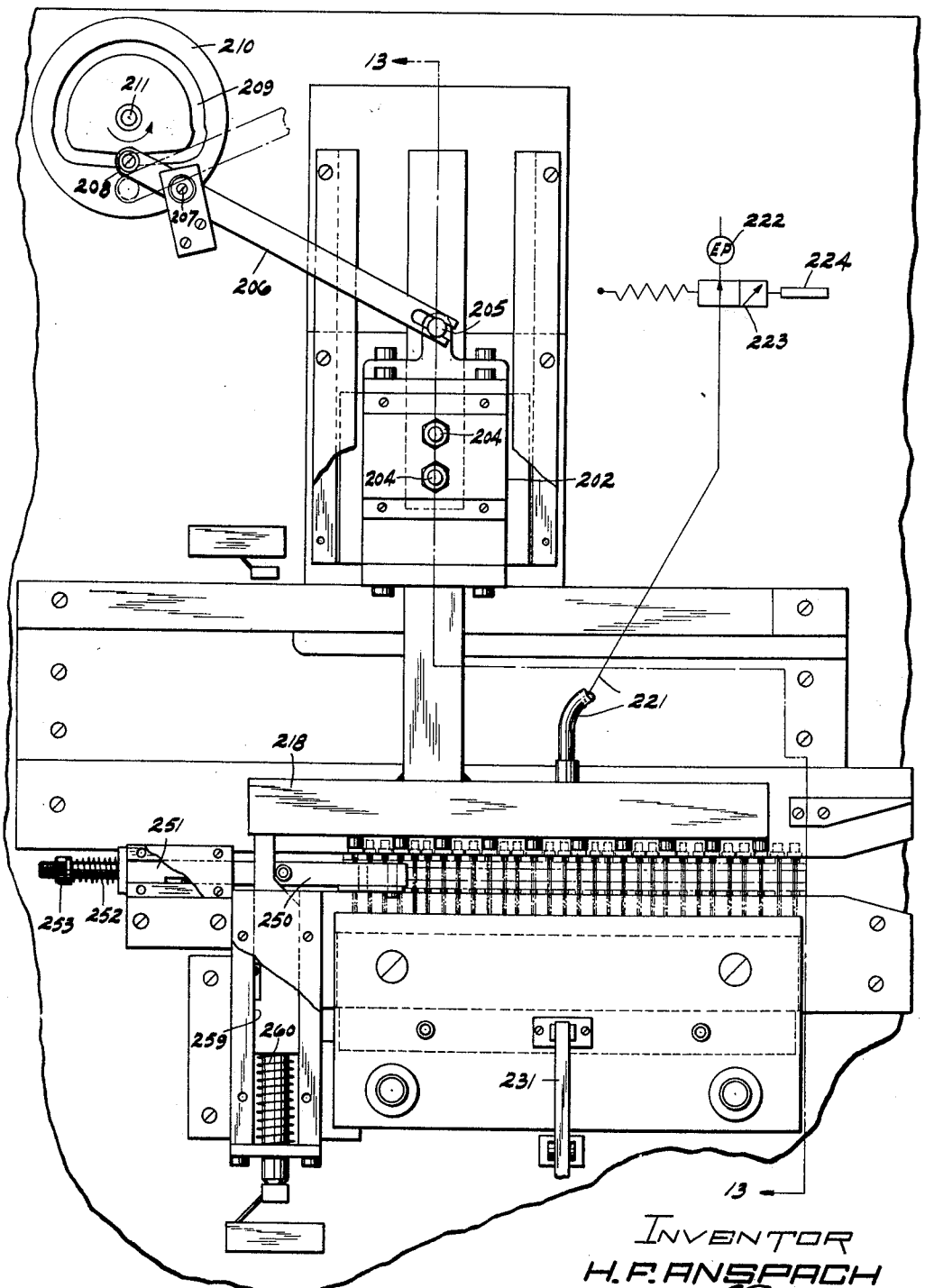
FIG_12

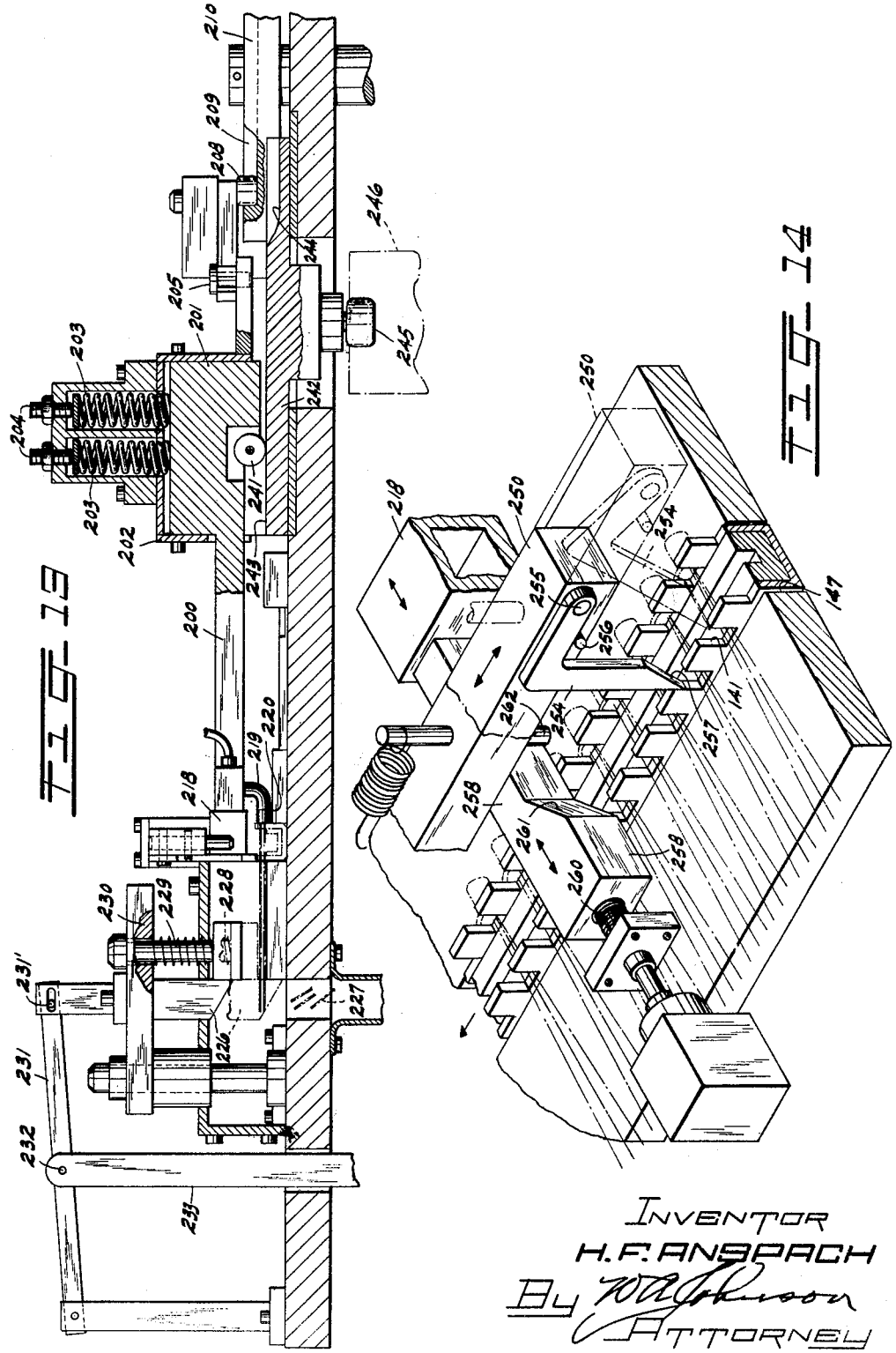

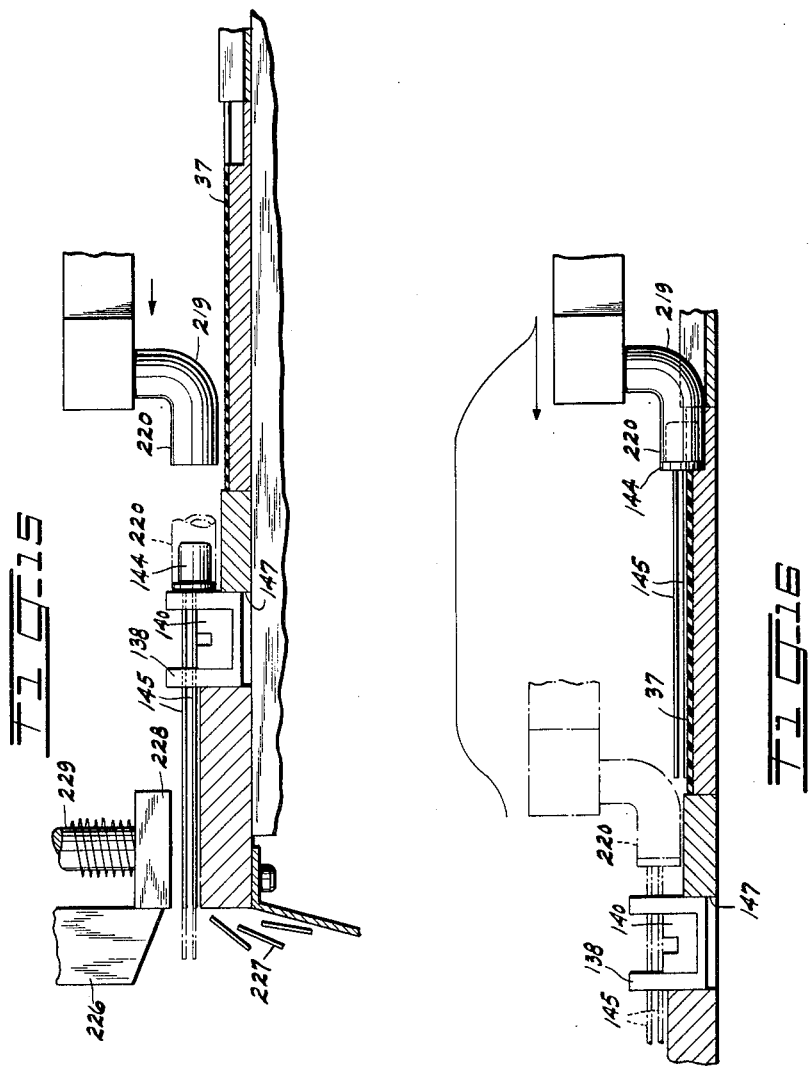

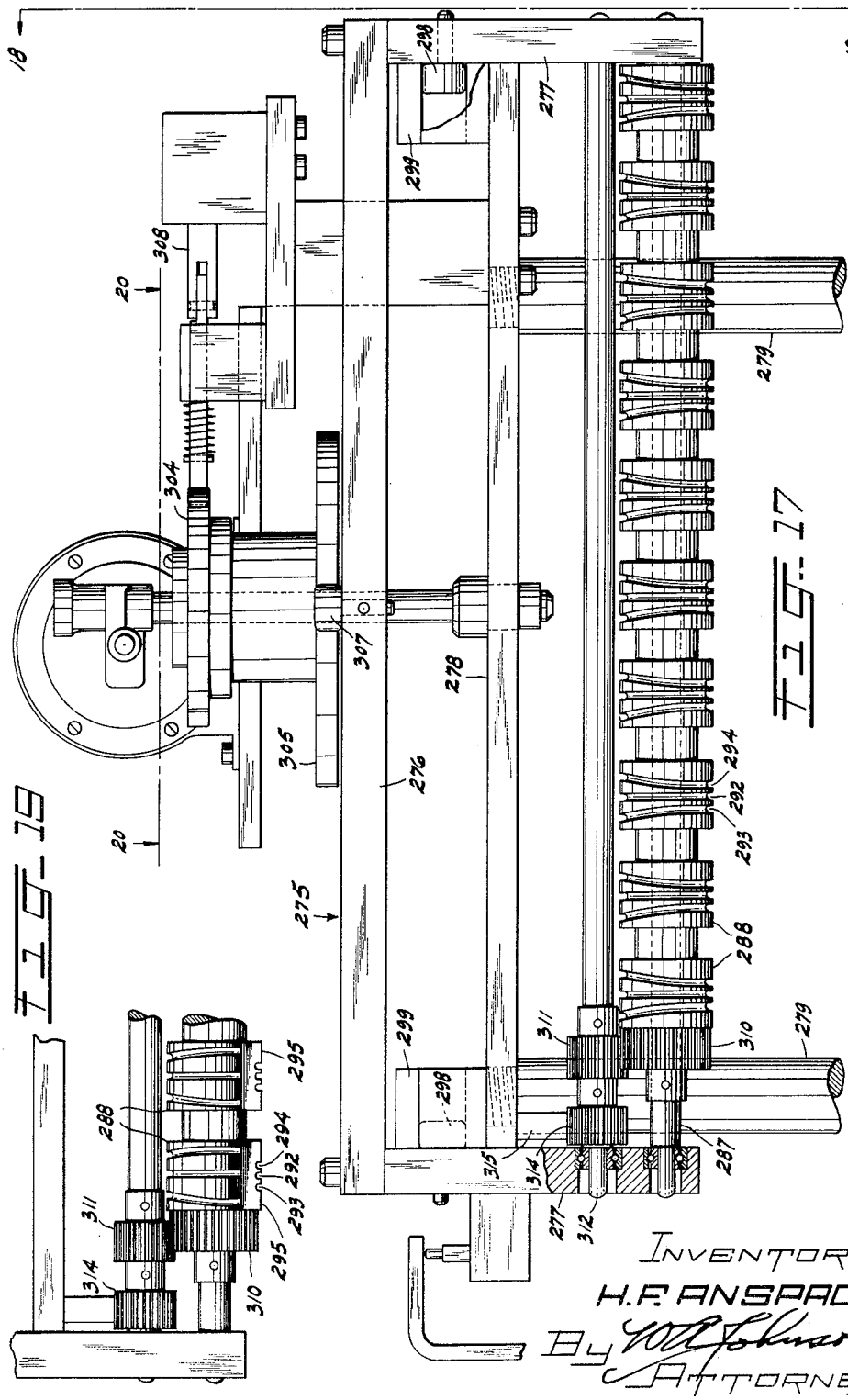

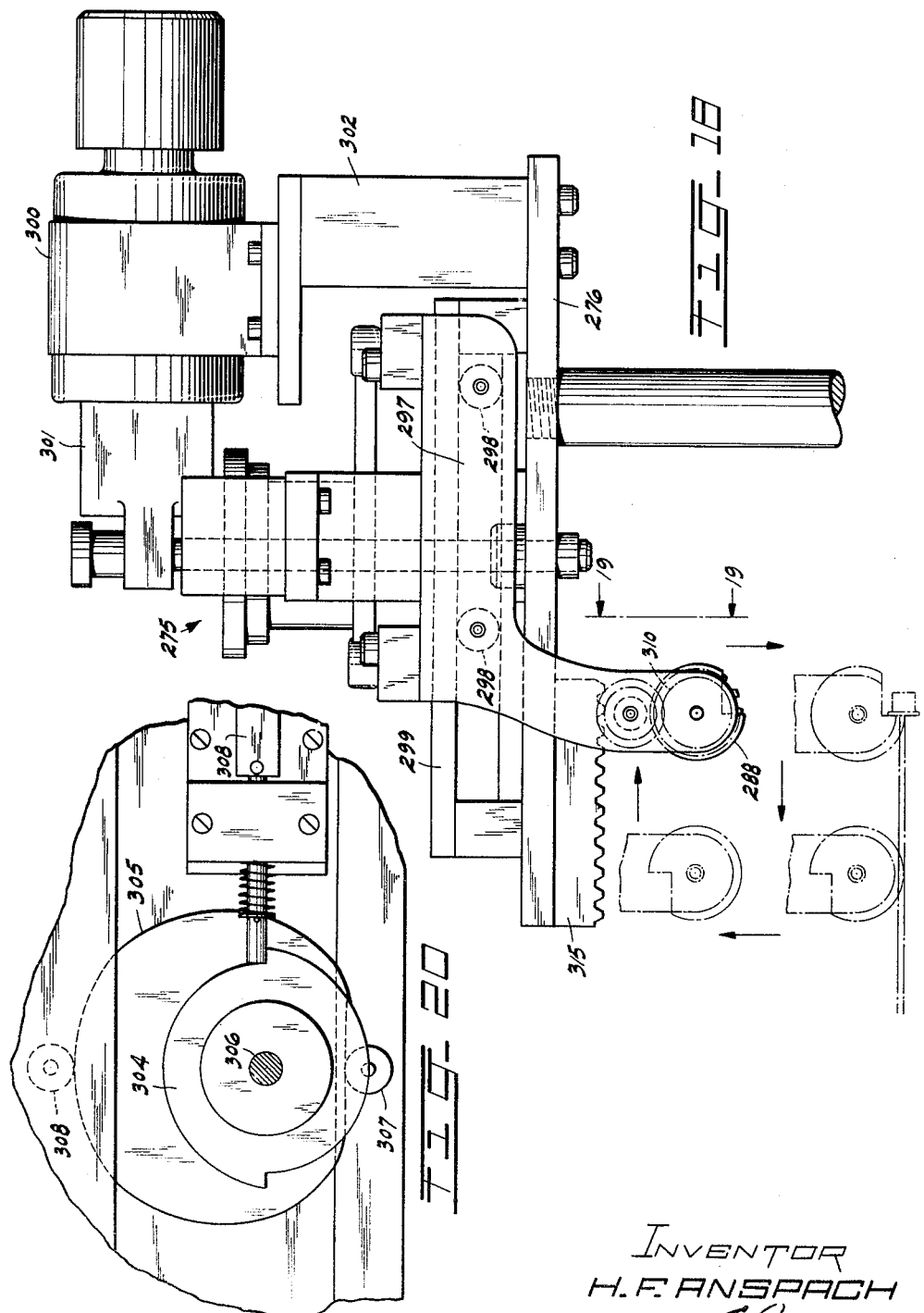

April 13, 1965      H. F. ANSPACH      3,177,629
APPARATUS FOR LOADING COMPONENTS
Filed Oct. 3, 1961                    24 Sheets-Sheet 16

INVENTOR
H.F. ANSPACH
By W. W. Johnson
ATTORNEY

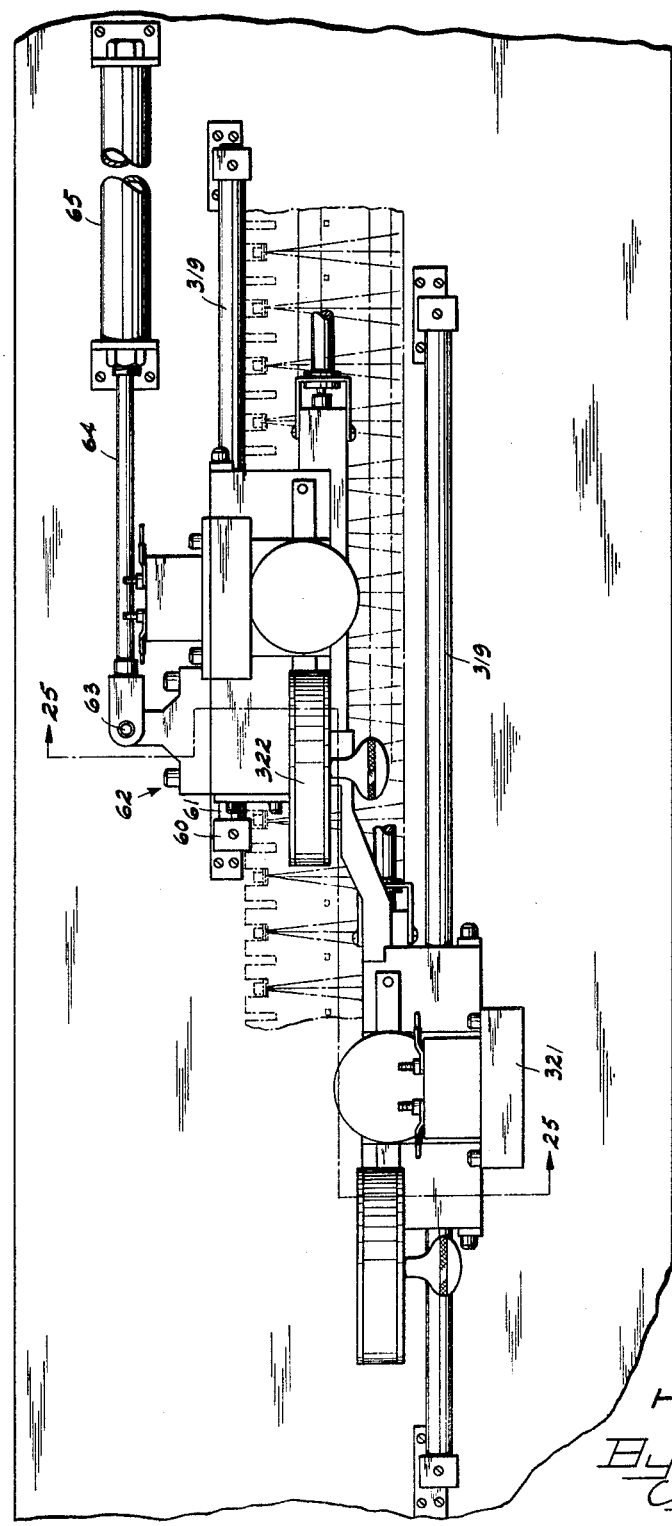

April 13, 1965 H. F. ANSPACH 3,177,629
APPARATUS FOR LOADING COMPONENTS
Filed Oct. 3, 1961 24 Sheets-Sheet 18
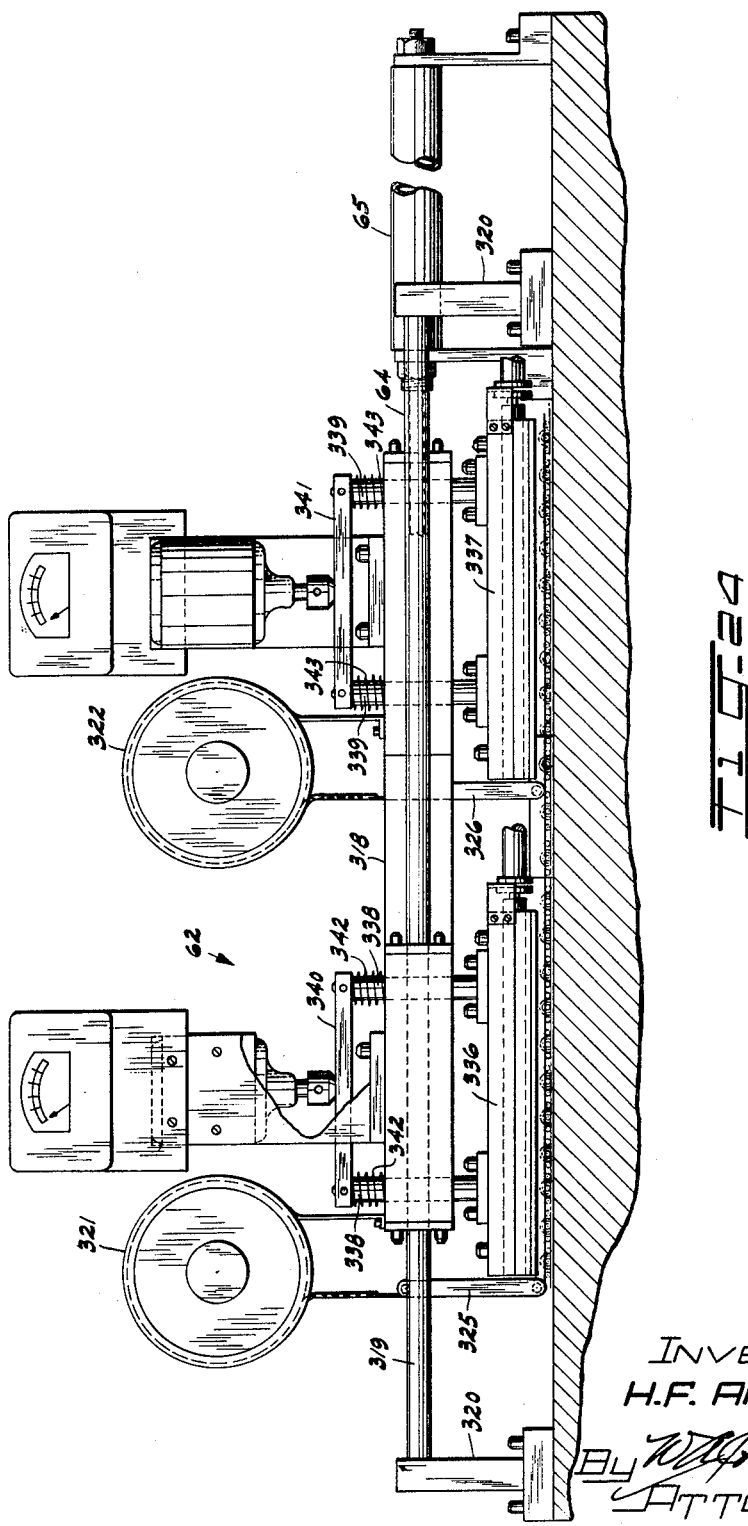

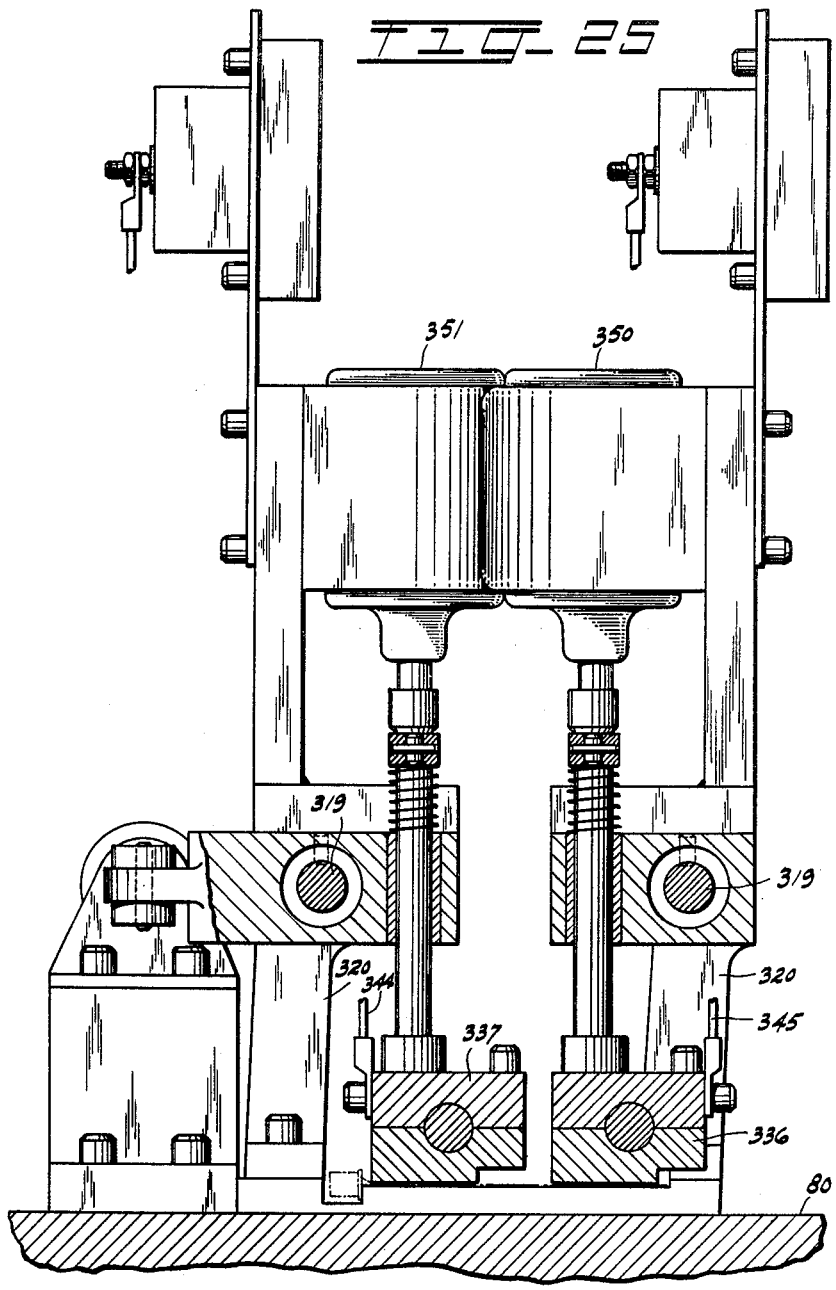

April 13, 1965 H. F. ANSPACH 3,177,629
APPARATUS FOR LOADING COMPONENTS
Filed Oct. 3, 1961 24 Sheets-Sheet 20
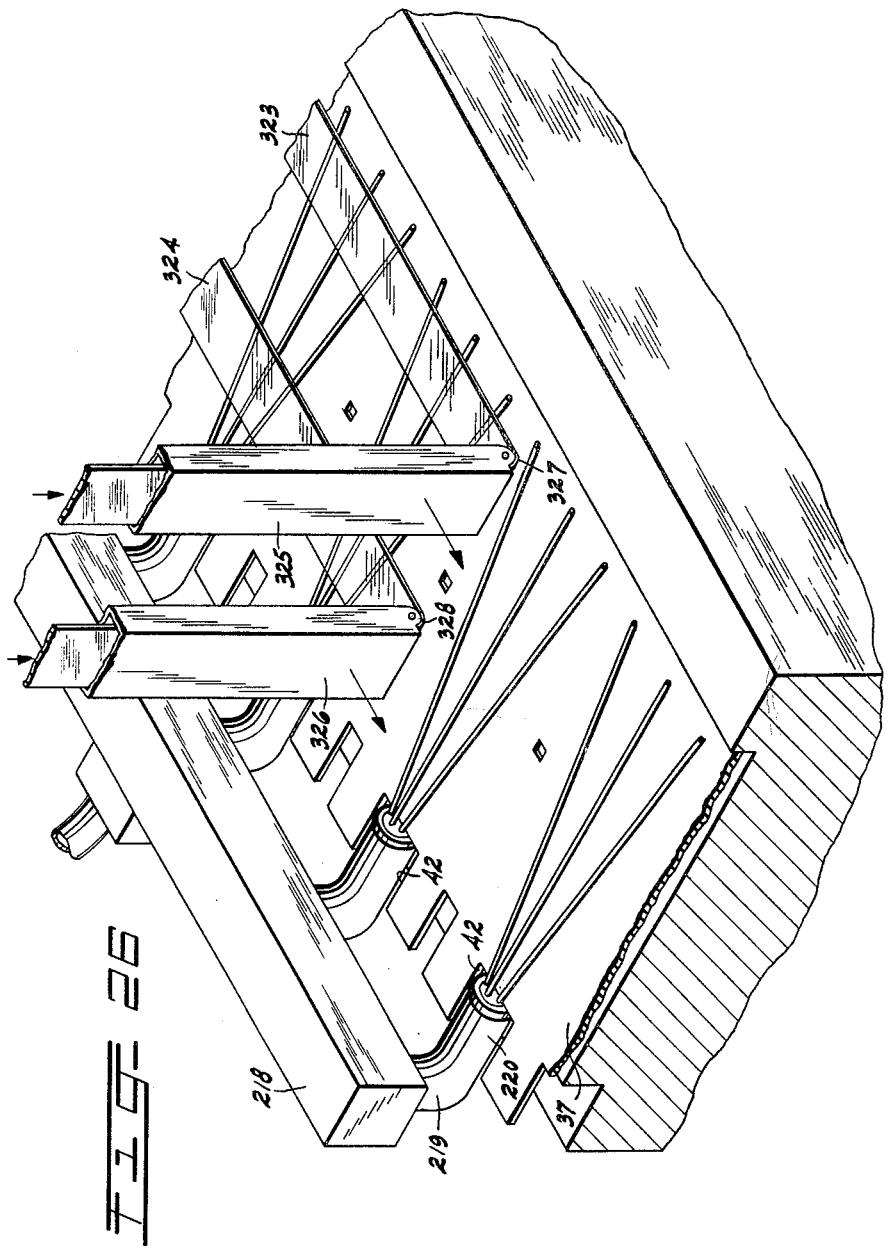
INVENTOR
H. F. ANSPACH
By
ATTORNEY

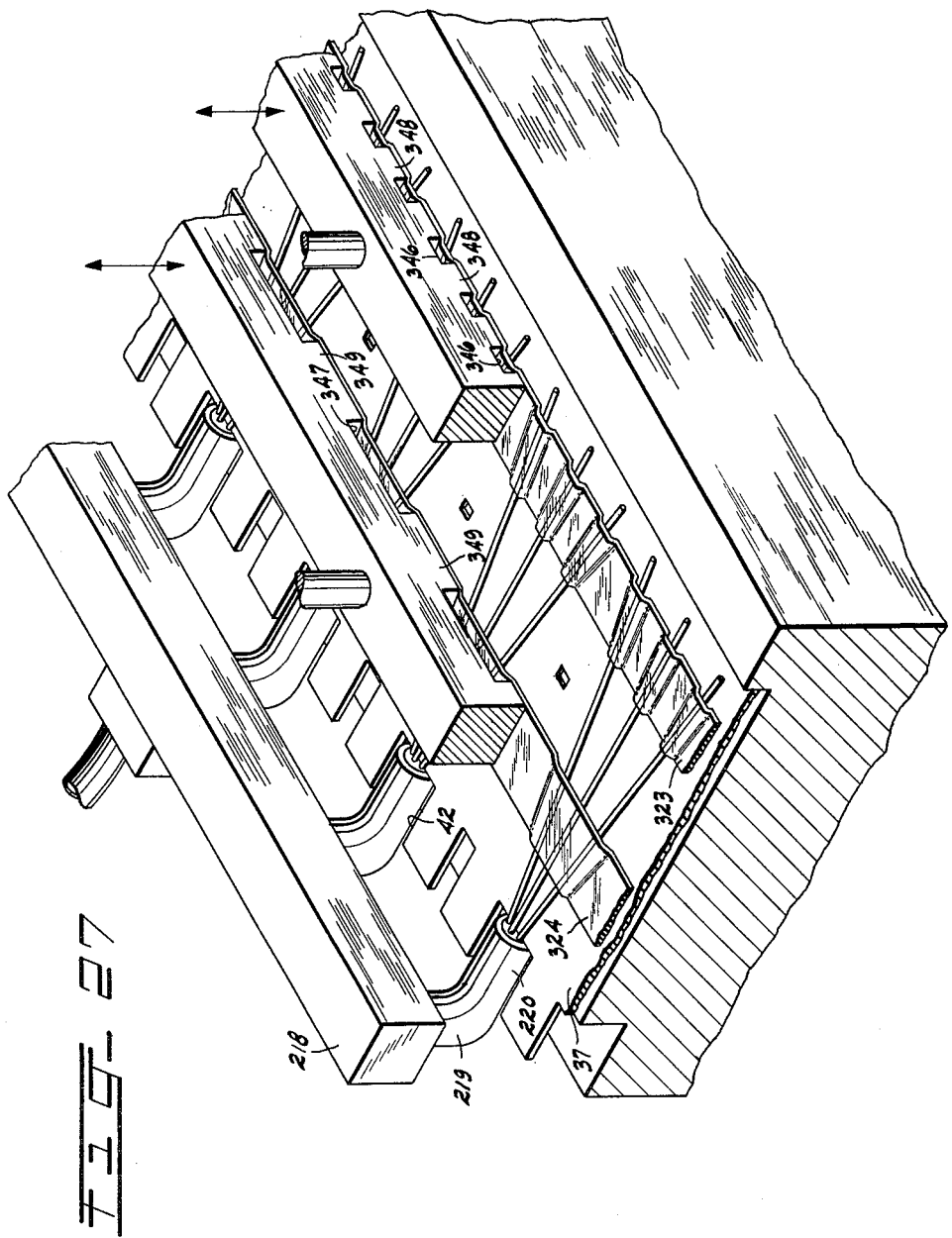

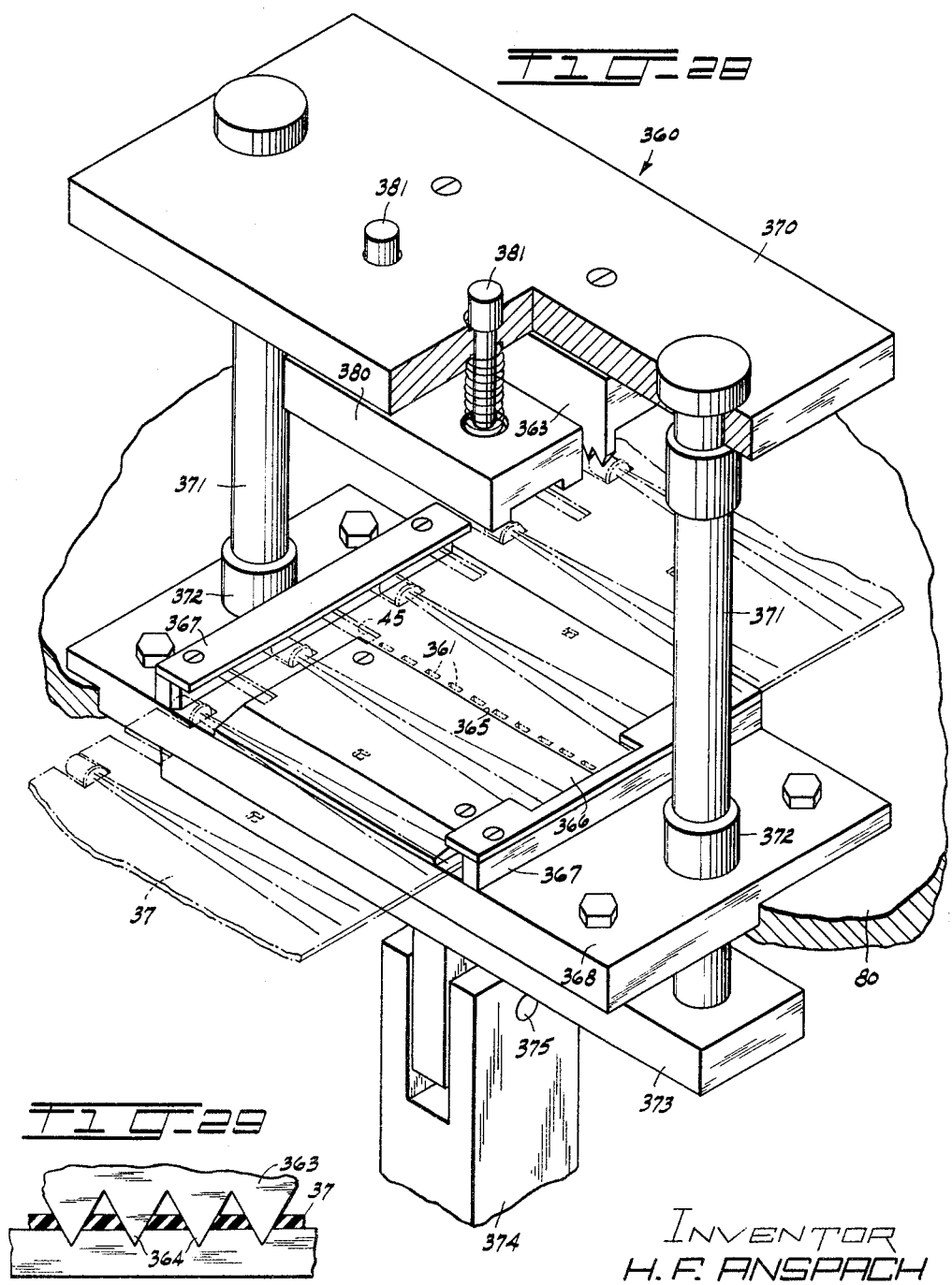

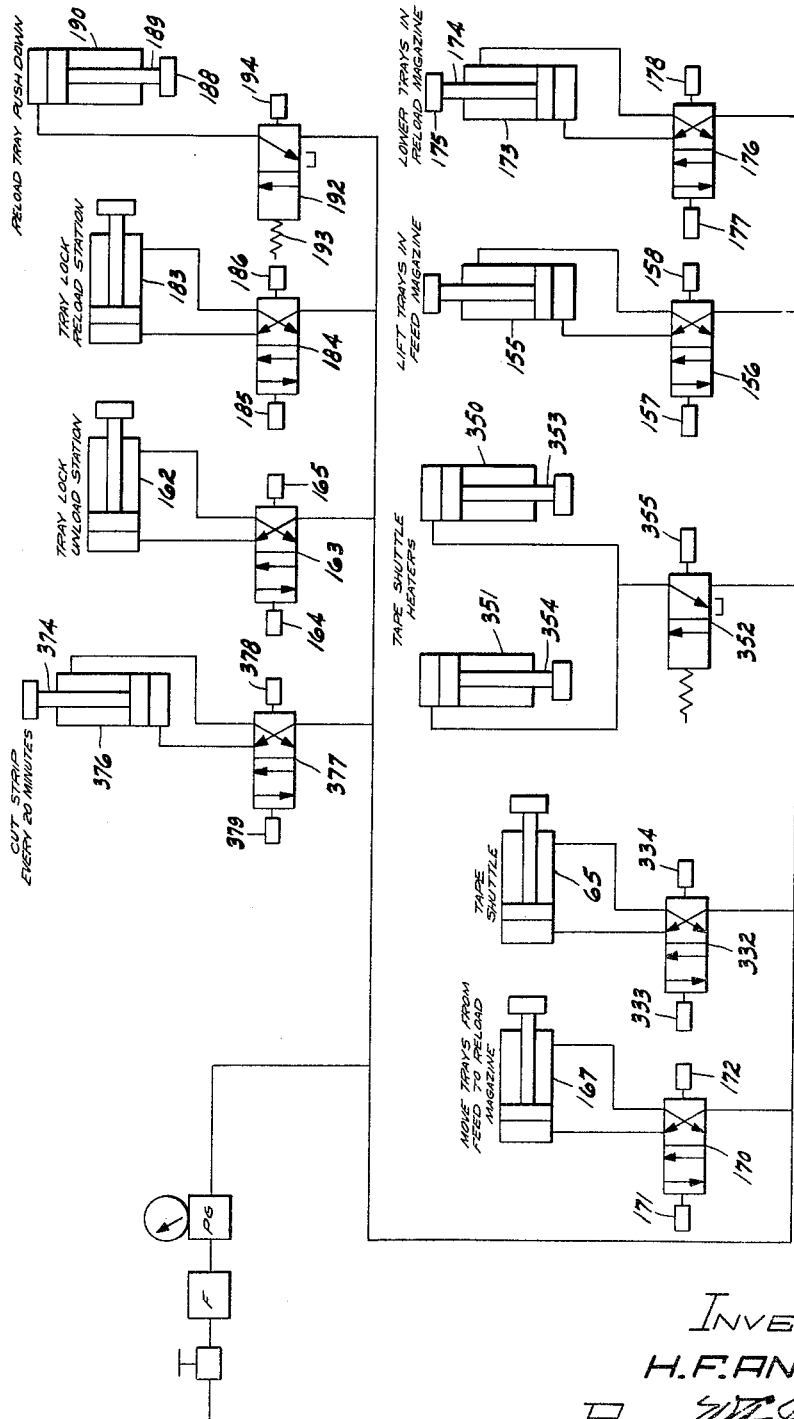

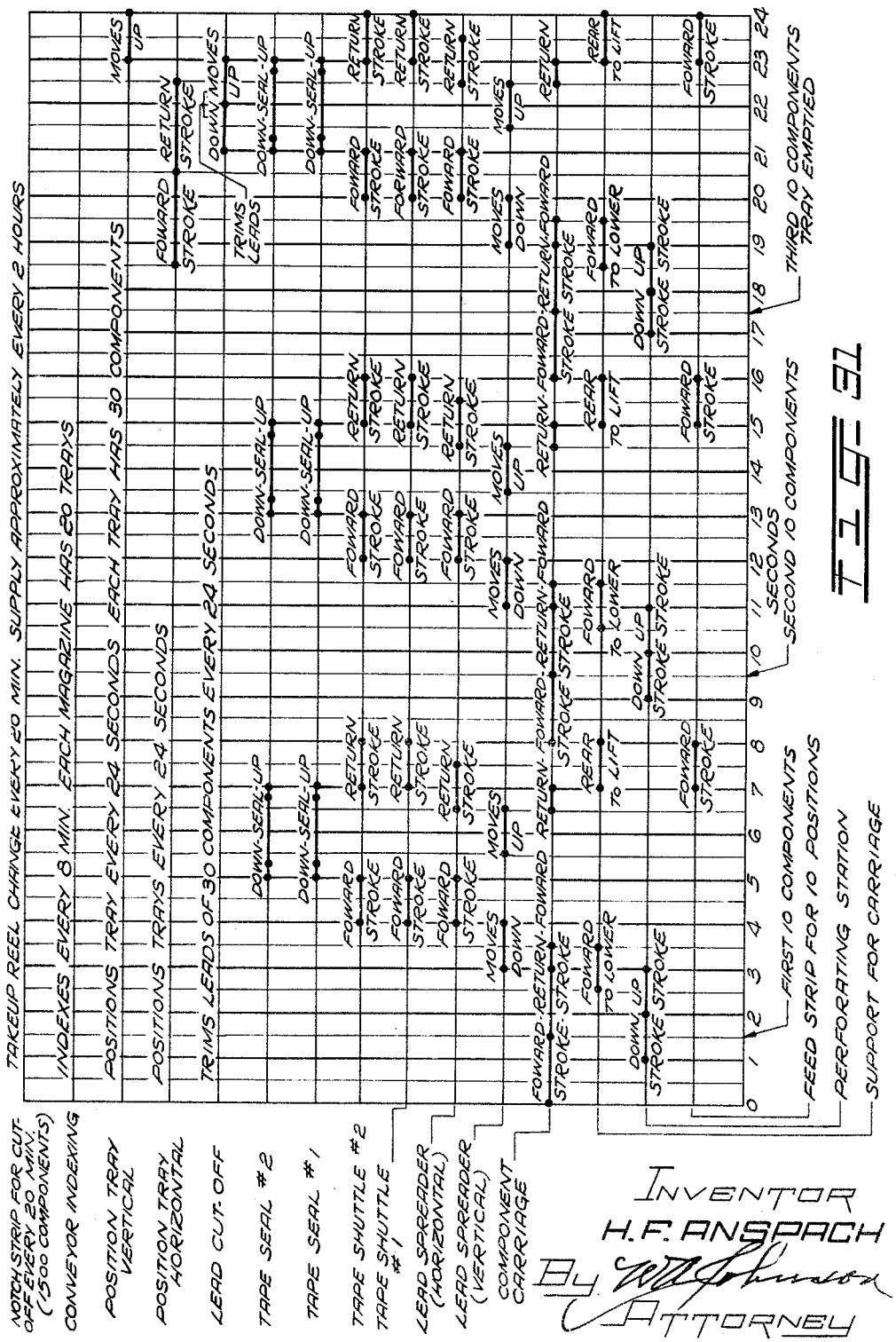

United States Patent Office 3,177,629
Patented Apr. 13, 1965

3,177,629
APPARATUS FOR LOADING COMPONENTS
Herman F. Anspach, Reading, Pa., assignor to Western Electric Company, Incorporated, a corporation of New York
Filed Oct. 3, 1961, Ser. No. 142,556
41 Claims. (Cl. 53—198)

This invention relates to apparatus for loading components, particularly components having groups of leads extending from like ends thereof on dielectric strips.

After the manufacture of various types of components, the components must be subjected to various tests to determine their electrical characteristics and to sort them or reject them depending, for example, on their relationship with predetermined standards. At the present time, many of these components are very small and provided with leads which may be bent readily making it difficult to move the components through numerous tests and to be sure of the inclusion of their respective leads in definite parts of test circuits. For these reasons, it has been determined that the components must be supported for handling on a card formed of suitable dielectric material and with the leads spaced accurately known distances from each other and held firmly, but not positively, to the card for movement through numerous testing areas. Such a handling card is disclosed in Patent 3,086,652 issued to R. F. Lipscomb and assigned to the same assignee as this invention.

The object of the present invention is a completely automatic and highly efficient apparatus for loading components on dielectric strips.

In accordance with the object, the invention comprises the intermittent advancement of a dielectric strip relative to operating stations where apertures are punched in the strip, components are located in their respective apertures with their leads resting on the strip, the leads are spaced given distances from each other and secured to the strip.

More specifically, it may be said that the apparatus functions in multiples of 10 in that a perforating unit punches 10 groups of apertures in a strip after which 10 components are loaded successively in their respective spaced apertures and while being held by the transfer unit, the groups of leads of the 10 components are spaced uniformly after which a tape shuttle is operated to move a tape across the spaced leads, following which a heated element is operated to seal the tape to the strip at opposing sides of the leads to firmly hold the leads at their spaced positions on the strip. Other operations are performed including trimming of the leads prior to mounting on the strip, the positioning of trays of components so that the trays may be moved out of a magazine at a feeding station and when the 30 components have been removed in three groups from each tray at the feeding position and the tray is empty, the empty tray will be transferred to a reloading station where it will be loaded with other empty trays in stacked formation in a previously emptied magazine.

Other objects and advantages will be apparent from the following detailed description when considered in conjunction with the accompanying drawings wherein:

FIGS. 1 and 2, when placed numerically end to end, illustrate a top plan view of the apparatus;

FIGS. 3 and 4, when placed numerically end to end, illustrate the drive mechanism;

FIG. 5 is a top plan view of the feeding means for the strip;

FIG. 6 is an isometric view, with portions broken away, of the perforating unit;

FIG. 7 is a fragmentary isometric view of the die portion of the perforating unit;

FIG. 8 is a side elevational view of the tray unloading means and tray lock;

FIG. 9 is a fragmentary side elevational view of the tray loading means and the tray lock;

FIG. 10 is a front elevational view taken substantially along the line 10—10 of FIG. 8;

FIG. 11 is a fragmentary isometric view of one of the magazines being unloaded;

FIG. 12 is a top plan view of the component transfer unit;

FIG. 13 is a vertical sectional view of the component transfer unit;

FIG. 14 is a fragmentary isometric view of the tray advancing means;

FIG. 15 is a fragmentary vertical sectional view of a portion of the apparatus illustrating the association of the component transfer unit and the lead trimming means;

FIG. 16 illustrates the various motions of the chucks or suction heads of the transfer unit;

FIG. 17 is a front elevational view of the lead spacing unit;

FIG. 18 is a side elevational view of the lead spacing unit taken along the line 18—18 of FIG. 17;

FIG. 19 is a fragmentary detailed view taken along the line 19—19 of FIG. 18;

FIG. 20 is a fragmentary detailed view taken along the line 20—20 of FIG. 17;

FIG. 23 is a top plan view of the tape shuttle;

FIG. 24 is a vertical sectional view of the tape shuttle;

FIG. 25 is a vertical sectional view taken along the line 25—25 of FIG. 23;

FIG. 26 is an isometric view of a portion of the apparatus illustrating schematically the positioning of the tapes over the spread leads;

FIG. 27 is a fragmentary isometric view illustrating the sealing of the tapes to the strip;

FIG. 28 is an isometric view of the cutting unit which partially cuts the strip after the given number of components has been mounted thereon;

FIG. 29 is a fragmentary detailed view of a portion of the cutting means;

FIG. 30 is a grouping together of the various electro-pneumatic control units; and FIG. 31 is a chart illustrating the time intervals during which various portions of the apparatus function.

Strip feed

Figure 1:
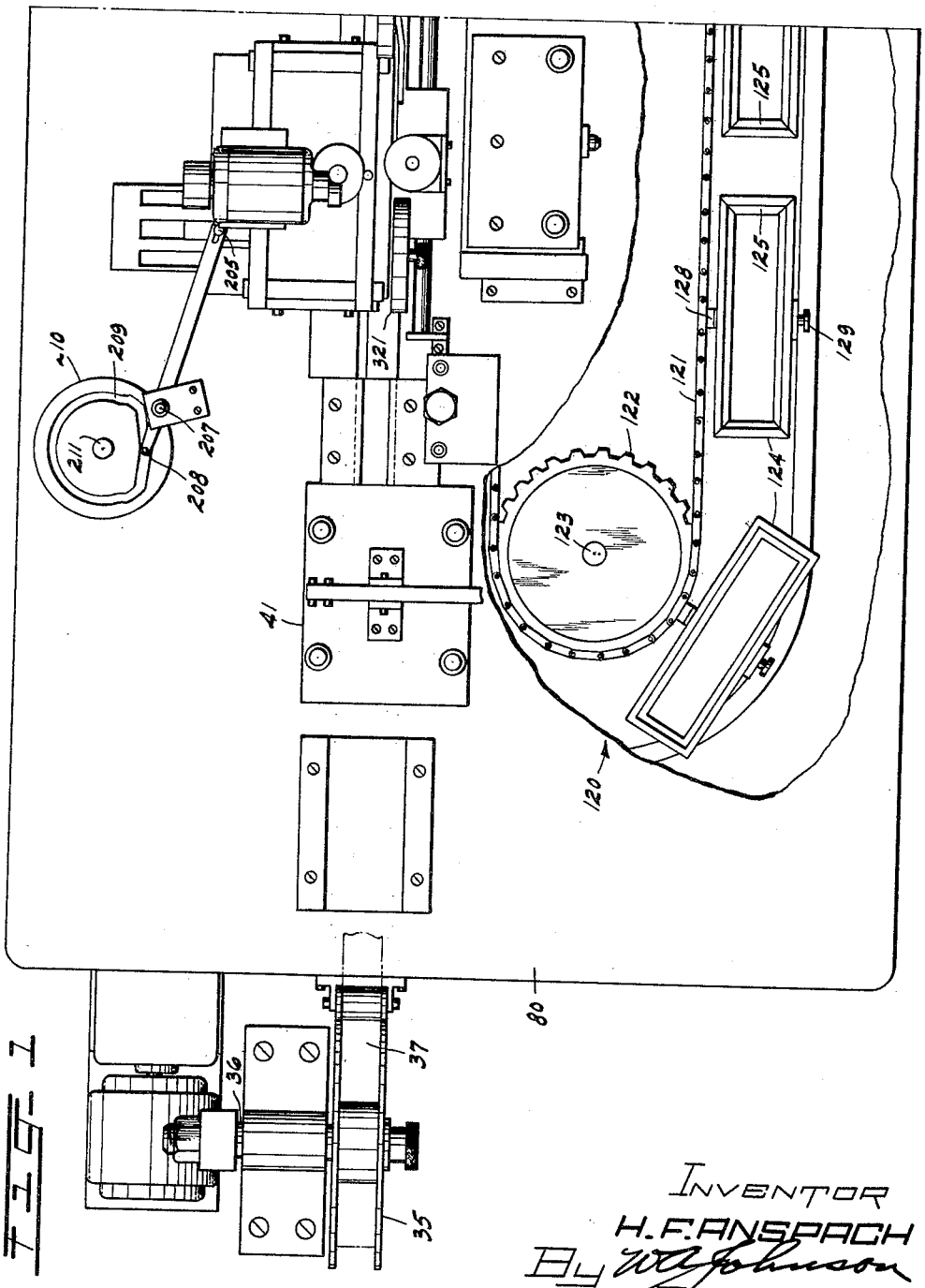

Beginning with joined FIGS. 1 and 2, a reel 35 removably mounted on a spindle 36 initially supports a supply of dielectric material, more commonly known as vulcanized fiber, which will be described as a dielectric strip 37. The supply is sufficiently large to last for over two hours of continuous operation of the apparatus. The apparatus and its controls are designed to mount 1500 components on a strip which will be taken up on a take-up reel, not shown. The main drive for advancing the strip includes a wheel 38 at the exit end of the apparatus, the wheel being of a width as shown in FIGS. 2 and 5 to receive the strip 37 on its drum portion 39 between annular flanges 40. A perforating unit, indicated generally at 41, will operate to punch apertures 42 in the strip for receiving components 43, these apertures being provided with inner surfaces 44 against which the components will be held. The perforating unit will also punch other apertures 45 in the strip, these apertures being utilized by projections 46 of the wheel 38 to advance the strip 37 accurately what may be defined as 10 positions during each half cycle of the wheel 38.

The drive for the wheel 38 originates with a motor 48 (FIGS. 3 and 4) which drives a main shaft 49 on which a beveled gear 50 is mounted. The gear 50 drives a beveled gear 51 which is mounted on a spindle 52 which supports a sprocket 53 for driving a shaft 54 through the aid of a chain 55 and a sprocket 56. A half-revolution clutch, illustrated schematically at 57, has one portion fixed to the wheel 38 and another portion fixed to the shaft 54 so that when a clutch release element 58 is moved outwardly by the energization of a solenoid 59, the wheel 38 will be driven one-half revolution. This operation is repeated for each advancing motion of the strip 37 longitudinally.

An additional feed includes a unit 60 of a conventional type adapted to grip the strip 37 when the unit is moved to the right and to free the strip when the unit is moved to the left. The details of this unit are not believed necessary for complete disclosure, as any unit of this type may be employed. The important feature is the reciprocation of the unit 60 to impart desired longitudinal motions to the strip 37. The unit 60 is connected at 61, FIG. 23, to a tape shuttle 62 which is connected at 63 to a piston rod 64 of an air cylinder 65. The action of the air cylinder 65 will be described more in detail during description of the tape shuttle 62. The unit 60 is connected at 68 to one end of a chain 67 which extends around a sprocket 69 and has the other end fixed to a desired portion of the sprocket. The sprocket 69 is fixed to a one-tooth ratchet 70 which is fixed by suitable means to the wheel 38 or the shaft supporting the wheel. An arm 71 is fixed to the shaft on which the sprocket 56 is mounted and is caused to rotate one-half revolution during each advancing period. Therefore, the arm 71 is provided with palls 72 at opposing ends thereof which are held inwardly by springs 73 and mounted on spindles 74 on which cam followers 75 are mounted.

In the present illustration in FIG. 4, the uppermost pall is in engagement with the single tooth of the ratchet 70 so that during the next half cycle with the clutch engaged through this drive means, the wheel 38 and the ratchet 70 will be rotated one-half revolution and as they reach this position, a stationary cam 76 will cause rocking movement of the cam follower 75 to move the pall 72 free of the one-tooth of the ratchet wheel 70, freeing the ratchet wheel 70 to return to its uppermost position. However, during this one-half cycle, the sprocket 69 has been rotated sufficiently to cause the chain 67 to move the unit 60 the desired distance and when the pall is released, the unit is free to be returned to its starting position by air cylinder 65.

*Perforating unit*

The strip 37 is supported for substantially the full length of its travel through the apparatus by a table-like structure 80 and, in most instances, between suitable guides at the sides thereof. The first or perforating unit 41 near the left end of the apparatus (FIG. 1) is shown more in detail in FIGS. 6 and 7. In FIG. 7, a die 78 is mounted on a portion of the table and is provided with die cavities 82 and 83 for receiving their respective punches 84 and 85 for forming apertures 42 and 45 in the strip 37. As previously stated, the different units function in multiples of 10 meaning that the perforating unit 41 will punch apertures 42 and 45 for 10 component supporting portions of the strip. The perforating actions of the unit 41 are such that there will be no variations in the spacings of the apertures throughout the entire length of the strip.

The unit 41 has a stripper plate 86 mounted above the path of the strip 37 and provided with suitable apertures 87 and 88 for the punches 84 and 85. The punches 84 and 85 are mounted on suitable punch holders 90 which are secured to a plate type ram 91 supported for movement on spaced guide rods 92 carried at 93 by the table 80. Another row of punches 94, carried by punch holders 95, mounted on the ram 91, is provided with apertures 96 in the stripper plate 86 and suitable cavities 98 in the die 78. A pilot pin 100 supported at 101 and fixed to the ram 91 by suitable means, not shown, is receivable in an aperture 102 of the fixed position stripper plate 86 in advance of the punches to assure registration of the punches with their apertures and die cavities.

The means for operating the ram 91 to, in effect, operate the punching unit 41, includes a lever 103 connected at 104 to a yoke 105 fixedly mounted at 106 to the top of the ram 91 and having one end pivotally mounted at 107 at the top of a fixed post 108 and the other end pivotally connected at 109 to a pull rod 110. The pull rod 110 is shown in FIG. 3 connected at its lower end 111 to an eccentric 112 mounted on a spindle 113 and operatively connected through a one-revolution clutch 114 and a beveled gear 115 to the main drive shaft 49. When the clutch 114 is released through energization of a solenoid, the eccentric 112 will move through one complete cycle causing the perforating unit 41 to operate through a complete cycle to form the apertures 42 and 45 in addition to other apertures 118 in the strip 37. The apertures 118 are centrally aligned with the apertures 45 so that eventually when the strip 37 is cut to separate the different component supporting portions, the apertures 45 and 118 will produce notches in the opposing sides of these portions. During the initial setting up of the apparatus, a pre-punched strip is taped in abutting connection to the leading end of the strip, threaded through the apparatus, and attached to the wheel 38 so that the leading portion of the strip 37 will be in the punching area. The apparatus is operated manually to render inoperable most of the units of the apparatus until a series of punching operations have been performed, to move the strip with the first group of apertures 42 and 45 into the area where the first group of 10 components are to be mounted thereon.

Following the punching of the apertures, a number of operating means is somewhat centered on a given area so that a group of 10 components may be removed from a supply, transferred to the strip, located thereon and held thereon, while another means is operated to spread the leads of the components of this group, to position tape thereon and to seal the tape on the strip to hold the leads of the components in place. To begin with, there is a supply means indicated generally at 120.

*Component supply*

Specifically, this means includes a conveyor in the form of an endless chain 121 extending around sprockets 122, supported on spindles 123. Rectangular hollow supports 124 have recesses 125 therein to removably receive and support magazines 126 (FIGS. 1, 8, 9, 10, and 11). The supports 124 are fixed at 128 to equally spaced links of chain 121 and are provided with pairs of rollers 129 (FIG. 8) which ride above and below an angular track 130 extending in somewhat of an oval path about the conveyor and fixed to any suitable supporting means 131. The chain or conveyor is driven a distance equaling the distance between the vertical centers of the supports 124 once every 8 minutes, as each magazine 126 is loaded with 8 minutes' supply of components before being placed on the conveyor or on its respective support 124 thereof.

The driving means for the conveyor is illustrated in FIG. 4 including a beveled gear 133 mounted on the main shaft 49 and interengaging a beveled gear 134 which is connected through a one-revolution clutch 135 to a sprocket 136 which is of sufficient size to advance the conveyor the desired distance during each revolution of the clutch 135, when free to be engaged by energization of a solenoid 137.

The magazines 126 are hollow structures adapted to rest in the recess 125 of any of the supports 124 and has like vertical recesses 135 in each end thereof with a V-shaped projection 136 extending inwardly from like sides of the recess. The recesses 135 are closed at 137 at their lower ends to support a stack of trays 138, the ends of which are receivable in the recesses and are provided with vertical grooves 139 to engage the V-shaped projections 136 to serve in positioning the trays accurately in stacked formation. The trays 138 are substantially U-shaped in cross-section providing a channel 139 therein to receive and support an elongated permanent U-shaped magnet 140 extending the full length of each tray. The side walls of each tray are provided with aligned pairs of recesses or notches 141 of like depths down to, or slightly below, the magnet 140 providing equally spaced projections 142.

In the present instance, there are 30 pairs of recesses or notches 141 in each tray to receive an equal number of components 144, positioned as shown in FIG. 11, with their group of leads 145 extending from one end of the component through their aligned pairs of the recesses 141. The magnet will firmly but removably hold the components in place allowing the free ends of the leads 145 to extend into the wider portion of the magazine 126. The trays are loaded with the components and 20 trays are loaded in each magazine before the magazine is brought to the apparatus and placed on one of the supports.

*Feeding and reload stations*

In the apparatus, there is a feeding station, indicated generally at 146 (FIGS. 8, 10, and 11) where the stack of trays in the magazine 126 at that station will be moved upwardly each 24 seconds so that the 30 components in the top tray may be removed during each 8 seconds to transfer groups of 10 components to the strip 37. When the uppermost tray is emptied, it is moved longitudinally in a guided path 147 to a reloading station where a previously emptied magazine will receive all of the trays successively in stacked formation as they are emptied and moved away from the feeding station and the magazine located at that station.

In FIGS. 8 and 10, the means is illustrated for moving the stack of trays 138 upwardly from the magazine 126 at the feeding station. This means includes an element 150 supported near its ends by guide rods 151 movable in bearings 152 of a housing 153 and supported at its center by a piston rod 154 of an air cylinder 155. The air cylinder is shown schematically in FIG. 30 and is under the control of a valve 156 operated by solenoids 157 and 158 in such a manner that normally the element 150 will be disposed at its lowermost position, free of the magazines and their supports 124, as they are moved into the feeding station.

The first action of the air cylinder is to move the element 150 until it engages the bottom tray 138 in the stack of trays and then move the stack of trays upwardly until the uppermost tray is in position for movement in front of the component transfer unit. Subsequent operations of the air cylinder 155 move the stack of trays upwardly once every 24 seconds for the positioning of a new tray in the feeding position. The trays have undercut portions or recesses 158 adjacent their ends to receive locking members 159 (FIGS. 8 and 11) after each elevating motion of the lifting means or air cylinder 155 to extend beneath the second from the top tray and above the third from the top tray at each end to serve as a locking means against accidental upward movement of the stack of trays during the feeding operations to move the 3 groups of 10 components from each tray. The elements 159 are supported by a member 160 mounted on a piston rod 161 of an air cylinder 162.

The air cylinder 162 is shown in FIG. 30 under the control of a valve 163 which is operated at predetermined intervals by energization of solenoids 164 and 165, these operations being immediately before each elevating or lifting action of air cylinder 155 to withdraw the elements 159 and immediately following the action of that cylinder to insert the elements. The controlling means at the reloading station is substantially identical to that at the feeding station with the exception of the actions of tray supporting element and particularly its supporting air cylinder. At the reloading station, which is the station immediately to the left of the feeding or unloading station, the magazine previously emptied of its trays adjacent the feeding station is at rest to receive the successive trays from its succeeding magazine. After each tray 138 has been emptied at the feeding station, an air cylinder 167 is operated to cause its piston rod 168 to move an element 169 to engage the right end of a full tray, move it to an unload position in front of the transfer unit and, in doing so, the empty tray is moved through the guide 147 (FIG. 11) to the reloading station where it will be aligned with the recesses 135 of the magazine at that station. The air cylinder 167 is shown schematically in FIG. 30 as being under the control of a valve 170 operated by solenoids 171 and 172 to move the member 169 during predetermined intervals every 24 seconds to feed the empty tray to the reloading station and to return to its normal position.

Although the air cylinder, similar to the air cylinder 155 at the feeding station for supporting an element similar to the element 150, is not shown in detail, it is shown schematically in FIG. 30 at 173 where its piston rod 174 supports an element 175 adapted to support the empty trays successively until 20 empty trays have been lowered into the magazine at the reloading station. The air cylinder 173 is under the control of a valve 176 which is operated by energization of solenoids 177 and 178 to cause the supporting element 175 to move to its top position in the empty magazine at the reloading station as soon as the empty magazine reaches that station or shortly thereafter, so that the member 175 will be positioned to receive the first empty tray from the feeding station. The subsequent operation of the air cylinder 173, through the action of its valve 176, will cause lowering of the member 175 a distance equaling the thickness of each tray so that the successive trays may be mounted in stacked formation and lowered into the recesses 135 of the magazine. This operation continues until the 20 empty trays have been loaded into the magazine at the reloading station after which the air cylinder 173 lowers its member 175 to its lowermost position out of and free of the magazine.

In FIG. 9, an additional means is provided at the reloading station including elements 180 similar to the elements 159 positioned at opposite ends of the magazine to be reloaded and supported by a member 181 mounted on a piston rod 182 of an air cylinder 183 so that after each empty tray has moved into position at the reloading station, the air cylinder is operated to move the elements 180 into position to prevent accidental movement of the air cylinder 173 and actually supporting the last empty tray in position to receive the next empty tray. The air cylinder 183 is shown schematically in FIG. 30 as being under the control of a valve 184, operated by the energization of solenoids 185 and 186. There is also a push down element 188 aligned with the empty trays being loaded into the reload station or the magazine 126 therein to assure location of the empty trays to receive the elements 180 and to position them to receive the successive empty trays. The push down element is mounted on a piston rod 189 of an air cylinder 190 supported by a bracket 191. The air cylinder 190 is shown schematically in FIG. 30 as being under the control of a valve 192 normally held in the position shown by a spring 193 to hold the element 188 upwardly and actuated by the energization of a solenoid 194.

*Component transfer*

The component transfer means for removing the components in groups of 10 from the trays 138 of the magazines 126 and onto the apertured dielectric strip 37 is shown in FIGS. 1, 12, 13, 14, 15, and 16. This means includes a carriage 200 having an enlarged head portion 201 slidable vertically in a holder 202 and urged downwardly normally by springs 203 carried by the holder 202 and provided with adjustable means 204 to vary the forces of the spring on the head 201 of the carriage. The holder 202 is connected at 205 to one end of a lever 206 which is pivoted at 207 and has a cam follower 208 mounted on the other end thereof. The cam follower is positioned to ride in a groove 209 of a cam 210 which is mounted on a shaft 211. In FIG. 3, the shaft 211 is shown as being under the control of a one-half revolution cam 212 to be driven by a shaft 214 on which a beveled gear 215 is mounted and operatively connected to the main drive shaft 49 through a beveled gear 216, when a solenoid 217 is energized to release the clutch for engagement. The clutch 112, in the present instance, is a half-revolution clutch and is controlled to bring about a half-cycle of movement of the carriage 200 during successive actions or operations of the solenoid 217.

The carriage 200 has a hollow member 218 mounted at a forward end thereof, the member supporting 10 L-shaped tubes 219 which have hollow chucks or suction heads 220 at their horizontal or free ends. The chucks 220 are spaced according to the spacing of the groups of 10 components that are to be removed from the trays. In other words, with the tray in the first position and starting from one end of the group of chucks, the first chuck will remove the first component, the second chuck will remove the fourth component, the third chuck will remove the seventh component, etc., for the first group of 10 components to be removed from the tray of 30 components.

The hollow member 218 is provided with a line 221 adapted to be connected alternately to an exhaust pump 222 and to atmosphere through the aid of a valve 223 which normally is adapted to connect the line to atmosphere and when a solenoid 224 is energized to connect the line to the exhaust pump or other suitable means adapted to create exhaust in the hollow member 218 and in the chucks or suction heads 220 to render them effective to remove components from the trays. The cam 210 is of a contour to more the carriage 200 forwardly, that is, to the left (FIG. 13) to cause the chucks 219 to engage and receive the next group of components.

At the end of this forward movement when each full tray 138 is moved into position, a cutter 226 (FIGS. 13 and 15) is operated to cut excess lengths 227 from the leads of all 30 components. A spring pressed pressure pad 228, supported by a rod 229, carried by an apertured member 230, fixed to the cutter 226, is movable in advance of the cutter to hold the leads firmly on the table 80 during the cutting operation. The cutter 226 is supported at its upper end at 230 by a lever 231 pivoted at 232 and connected to a pull rod 233, shown in FIG. 3. The pull rod 233 has its lower end connected at 234 to an eccentric 235. The eccentric 235 is mounted on a shaft 236 which is connected through beveled gears 237 and a one-revolution clutch 238 to the main drive shaft 49 when a solenoid 239 is energized.

The carriage 200 has a supporting roller 241 positioned to ride on a support 242, the main portion of an upper surface 243 of which lies in a given plane but there being a recessed or lower portion 244 to allow and bring about lowering of the carriage during intervals when the chucks, transferring a group of components from the tray, lower the components into their respective apertures 42 of the strip 37. This is brought about through action of the cam 210 returning the carriage 200 to its farthest position to the right (FIG. 13) at which time, the roller 241 is in the recess 244 and during a short forward movement, the chucks 220 move the components against the surfaces 44 of their apertures 42. While in this position, the carriage remains stationary during spacing of the leads and operation of a tape shuttle to secure or hold the spaced leads in their relative positions.

Prior to the next forward movement of the carriage, the carriage is returned or moved to the right (FIG. 13) to free the chucks 220 of their group of components. At that point, a drum type cam 246, driven by suitable means (not shown) operatively connected to the drive shaft 49 through a one-revolution clutch, causes its follower mounted on the support 242 to move the support to the right (FIG. 13) until the upper surface 243 is beneath the roller 241 and the carriage 200 is moved upwardly against the forces of the springs 203. This action moves the chucks 220 out of the apertures 44 and in positions above the strip 37 so that the chucks may be moved to the left at the start of the next cycle without distributing the strip or the components mounted thereon. This rearward action of the support by the cam 246 takes place just prior to, and during, the start of the forward movement of the carriage.

*Tray advancing unit*

The tray advancing unit is shown in FIGS. 12 and 14 and includes a bar 250 which is supported for movement longitudinally in a guide 251 and normally urged to the left by a spring 252, the force of which may be adjusted by a threaded element 253. A finger 254, L-shaped in general contour, is pivotally supported at 255 on the bar 250 and is limited in its counterclockwise movement by a pin 256 on which it rests normally. The lower end of the finger 254 has a tapered surface 257 reducing the lower end of the finger to an edge so that during action of the bar 250, it may enter the next recesses 141 back of the projection 142 of the tray where it is initially located.

A cam-like actuator 258 is slidable in a guide 259 and is normally urged toward the hollow member 218 by a spring 260. A cam surface 261 of the actuator 258 is positioned to engage a pin 262 of the bar 250 and force the bar to the right (FIG. 14) to position the finger 254 in the broken line position ready to enter the next recess 141. This unit is under the control of the component transfer unit in that during forward movement of the hollow member 218 with the carriage 200, the hollow member will engage the actuator 258 and move it against the force of its spring 260 freeing the bar 250 to be moved from the broken line position, shown in FIG. 14, to the solid line position and thereby advance the tray a distance of one position. This occurs during each of the three successive actions of the carriage 200 to remove the first, second, and third groups of 10 components from each tray. When the hollow member 218 is moved away from the bar 250, the actuator 258, through the force of its spring 260, is moved to its normal position moving the bar 250 to the broken line position to locate the finger 254 in registration with the next recess 141 of the tray.

*Lead spacing unit*

Figure 21:
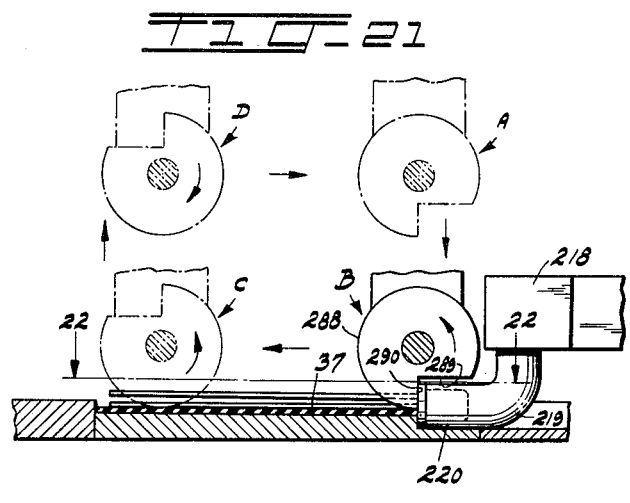
FIG. 21 is a fragmentary sectional view illustrating motions of the lead spacing unit while the components are held by the transfer unit.
Figure 22:
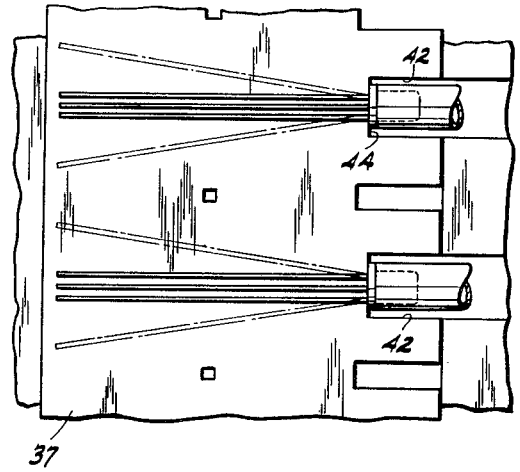
FIG. 22 is a fragmentary top plan view of a portion of the apparatus illustrating in solid lines the presumed initial positions of the leads and, in broken lines, the positions of the leads after the spacing operation.

After the group of components has been transferred from the tray to its respective position on the strip 37 and while being held in this position, as illustrated in FIGS. 21 and 22, the lead spacing unit, shown in FIGS. 17 to 20, inclusive, is operated. The lead spacing unit is indicated generally at 275 and includes a frame 276 with vertical end members 277 and a lateral member 278. The frame is supported by rods 279 which extend downwardly through guides 280 and 281 (FIG. 3) where their lower ends are connected to a member 282. The member 282 has a cam follower in the form of a roller 283 mounted thereon which rides in a goove 284 of a cam 285. The cam 285 is operatively connected to the main shaft 49 and is adapted to be driven through operating cycles in timed relation with the transfer unit and the other associated units so as to move the rods 279 and the frame 276 downwardly after the chucks 220 have moved into the position, shown in FIG. 21, to position the group of components in the apertures 42 of the strip.

The unit 275 has a shaft 287 rotatably supported by the vertical members 277 and provided with like lead spacing rollers 288 mounted at spaced positions thereon, positions which will correspond to the spacing of the components in their apertures 42. The rollers 288 have like recesses or notches 289 therein providing normal vertical surfaces 290 adapted to be positioned adjacent the ends of the components which engage the inner surfaces 44 of the apertures 42.

In the present instance, each component has three leads shown substantially parallel with each other in FIG. 22. Actually, during handling, these leads may become bent out of their parallel positions but their relative spacings, adjacent the component, are asssured. Therefore, the rollers 288 are provided with like central grooves 292 and like side grooves 293 and 294. These grooves are closely positioned according to the relative positions of the leads adjacent the component and with the relative association of the surface 290 with the adjacent periphery of each roll forming a substantial wedge-shaped structure, the starting edge 295 of each roller may be moved into position to assure accurate entrance of the leads of each component in their respective grooves 292, 293, and 294.

The rollers, through their supporting means, are moved into four positions, as illustrated in FIG. 21, in substantially a rectangular path beginning with a normal position A, FIG. 21, a starting position B, a final spacing position C, and an up position D. The vertical movements from A to B and from C to D are brought about through the action of the cam 285. The lateral movements between B and C and between D and A are brought about through the aid of a carriage 297 supported on the frame 276 for movement on rollers 298 in a path controlled by guide means 299. The drive means for the carriage 297 includes a motor 300 and speed reduction unit 301 mounted on a bracket 302 supported by the frame 276. The output end of the speed reduction unit 301 is operatively connected through a half-revolution clutch 304 to a cam 305 which is mounted eccentrically with respect to its drive shaft 306 and positioned to engage cam followers 307 and 308 mounted on the carriage 297, to move the carriage at predetermined intervals through its respective half-cycles, each time a solenoid 309 is energized to release the clutch 304 for engagement.

There is an additional driving means for the rollers 288 to cause them to roll on the strip 37, as they are moved between position B and C, in FIG. 21, this rolling action being counterclockwise between B and C and clockwise between D and A to return the rollers to their normal positions. This rolling action is brought about by a gear 310 mounted on the shaft 287, engaging a gear 311 mounted on a shaft 312 with a pinion 314, which engages teeth of a rack 315. The rack 315 is fixedly mounted on the frame 276.

It will be observed by viewing the contours of the central grooves 292 of the rollers that these grooves remain centrally of the rollers to straighten the central lead, whereas the companion grooves 293 and 294 of the rollers flare outwardly from their closely located starting positions to their widest finishing positions to cause movement of the outer leads in each group from the presumed parallel positions shown in FIG. 22 in solid lines to their outwardly spaced positions shown in broken lines.

*Tape shuttle*

While the chucks 220 remain in the positions holding their group of components in the apertures 42 of the strip 37 during the lead spacing operation, they remain in this position during operation of the tape shuttle, indicated generally at 62, to tape the spaced leads on the strip 37. The tape shuttle, as shown particularly in FIGS. 23 to 27, inclusive, includes a carriage 318 supported for longitudinal movement on parallel guide rods 319 having their ends mounted in fixed positioned brackets 320 mounted on a table 80. The tape shuttle supports cylindrical housings 321 and 322 for supplies of tape 323 and 324 to be fed downwardly through their respective guides 325 and 326 and beneath rollers 327 and 328 positioned above, but closely adjacent, the spread leads on the strip 37. The tapes 323 and 324 are of the types which are not adhesive but which may, through the application of heat and pressure, be sealed to the vulcanized fiber strip 37.

Furthermore, at the beginning of the operation of the apparatus, the leading ends of the tapes are threaded from their housings 221 and 222 through their guides 325 and 326 to positions beyond which the first component will be located and the shuttle will be located out of the way during the transferring of the first group of components onto the strip and during the spacing operation by the unit 275. However, as soon as the lead spacing unit 275 is moved out of the way, an air cylinder 65 is operated causing its piston rod 64, which is connected to the shuttle at 63, to move the shuttle rearwardly, relative to the strip 37, to lay the tapes over the spaced leads. Actually, the tapes are positioned on the shuttle so that their tapes will not be applied to the leads of the same group of components simultaneously, but so that the tape 323 will be applied to the spaced leads of the components while being held by their chucks 220 and the tape 324 will be applied to that group of leads after they have been advanced to the next position.

The air cylinder 65 is shown in FIG. 30 as being under the control of a valve 332 actuable by the energization of solenoids 333 and 334, to move the tape shuttle 62 to the end of its stroke toward the supply after the lead spreading unit has operated and to return the tape shuttle to its starting position during advancement of the strip 37. Actually, the tape shuttle moves in a direction opposing the direction of advancement of the tape until the newly spread leads have been covered with the tape 323 and the shuttle remains in this position until the tape is sealed and, on its return movement, it moves with the tape back to its starting position.

Heating units 336 and 337 are supported by parallel rods 338 and 339 connected at their upper ends by bars 340 and 341 and normally urged upwardly by springs 342 and 343. The heating units 336 and 337 are heated electrically through suitable lines 344 and 345. Furthermore, the undersurfaces of the units 336 and 337 have recesses 346 and 347, respectively, as illustrated in FIG. 27, so as to control sealing of predetermined portions of the tapes to the strip 37 without disturbing or sealing any portions of the tapes to the leads. The recesses 346 are for the individual leads providing intermediate portions 348 which will force adjacent portions of the tape in close engagement with the strip 37 and, while heating these portions, cause them to be sealed to the strip. In a similar manner, the recesses 347 straddle the entire group of leads providing intermediate portions 349 to engage the tape 324, heat it sufficiently and provide sufficient pressure to seal it to the strip 37.

The heaters or heating units are under the control of air cylinders 350 and 351 which are shown schematically in FIG. 30 as being under the control of a valve 352, shown in its normal position to cause the piston rods 353 and 354 thereof, to be held in their up positions by the springs 342 and 343 but operated in their down positions through energization of a solenoid 355.

Cutting unit

After 1500 components have been mounted on the strip 37 and this portion of the strip approaches the advancing wheel 38, the strip moves through a cutting unit 360 which is shown in detail in FIG. 28. In the present illustration, the strip 37 is partially cut by a series of perforations 361 extending laterally across the strip from the center of one of the apertures 45 and an aligned aperture 118. This is brought about through the aid of a cutter 363 having a suitable cutting edge such as cutting teeth 364 cooperating with a straight cutting edge 365 of a member 366. The member 366 is supported between guides 367 mounted on a member 368, it being mounted on the table 80. The cutter 363 is mounted on the undersurface of a tool holder 370, the tool holder being supported by parallel rods 371 which extend through guides 372 in the member 368 and have their lower ends connected to a yoke 373. The yoke 373 is connected to a piston rod 374 at 375 of an air cylinder 376 (FIG. 30) which is under the control of a valve 377 actuated at predetermined intervals which, in this instance, is every 20 minutes, into its down and then up position through successive energization of solenoids 378 and 379.

The strip 37, in traveling over the member 366, is firmly supported thereby and through the cooperation of a pressure pad 380 held by spring pressed pins 381 and leading the cutter 363 toward the strip, the strip is held on the member 363 during the partial cutting operation. This partial cut of the strip permits strip feeding means, such as the advancing wheel 38, to continue the advancement of the strip and after the partially cut portion leaves the wheel 38, the brittle nature of the strip will enable the operator to readily sever the connection at the partially cut portion so that the length of tape on the take-up reel, not shown, with its 1500 components, may be removed and an empty reel put in its place. If it is desirable to make a complete cut of the strip 37 at the unit 360, the strip in the apparatus will continue to advance the set distances through action of the unit 60 and after a certain number of advancements in this manner, the leading portion will be connected to the wheel 38.

Operation

The time chart, shown in FIG. 31, should be most helpful in following the sequence of operation of the apparatus. The take-up reel, which is not a part of this apparatus, is changed every 20 minutes due to the fact that the present requirements call for a length of strip 37 with 1500 components thereon. The supply, in each instance, will last for over two hours and as the trailing end of each leaves the supply reel, the leading end of the new strip may be taped thereto in abutting relation to permit continuous automatic operation of the apparatus. The conveyor for the supply of components and the various magazines 126 moves every 8 minutes as each magazine, when placed on its support 124 holds 20 trays 137 with 30 components in each tray. When a magazine is in the feeding station, the operating means 155 at this station begins its operating cycle to move the uppermost tray into position after which the advancing means, shown in FIG. 14, responsive to each operating cycle of the carriage 200, locates the tray so that the successive three groups of 10 components may be removed therefrom.

Therefore, in following the chart shown in FIG. 31, this chart covers each group of 8 second periods through each 24 seconds of operation of the apparatus. Before considering this 24 second interval, it must be understood that the loaded tray for this interval was positioned vertically or moved up to the top position two intervals preceding this one. Also, this tray was moved into the component unloading position by air cylinder 167 during the interval immediately preceding this interval and the excess lengths cut from the leads by cutter 226. At the start of this 24 second overall period, the first 10 components are removed from the tray. After all 30 of the components in that tray have had the extra lengths cut from their leads, as shown in FIG. 15, according to the chart and as illustrated in FIGS. 15 and 16, the component carriage 200 is given a forward motion to pick up the group of components, a return motion to locate the leads of the group of components over the strip 37, and a short forward motion after the chucks have been lowered to move the components in their apertures. Here they are held through 3 seconds, while the lead spreading unit 275, shown in FIGS. 17 to 20, inclusive, is operated, the tape shuttle 317 is operated in its forward stroke, and the sealing units 336–337 are operated before the component carriage 200 returns to its normal position prior to starting its next cycle of operation. These motions are linked together, as illustrated by the chart, so that during each interval of 8 seconds, a group of 10 components has been removed from its tray, located on the strip 37, its leads spaced by unit 275, the spaced leads taped by the tape shuttle 317, and sealed by the heating units in time for the next series of steps, during the next 8 seconds, followed by a similar series of steps during the third 8 seconds to complete the first series of steps during the 24 seconds set forth in the chart.

These operations continue automatically with the punching unit, shown in FIG. 6, operating to prepare the strip 37 with its apertures so that at later positions along the apparatus, the components may be placed on the strip with their leads cut to length and eventually, through the functions of the different units, the leads will be spaced accurately on their respective portions of the strip and sealed by the aid of the tapes in positions where they will be held firmly with their leads adapted for subsequent engagement with contacts in electrical circuits.

The holding of the leads in their respective positions assures firm positioning of the components in their apertures for transportation to other apparatus and for movement through other apparatus with respect to testing means and for transportation or handling prior to installation in their particular electrical units, at which time, the components may be removed readily from the strip as the leads are not secured either to the strip or to the tapes holding the leads on the strip.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for loading components each having a group of leads extending from one end thereof on a strip comprising means to advance the strip longitudinally in a given path intermittently like distances between intervals of rest, means disposed adjacent the path and operable during the intervals of rest to punch apertures in the strip, a magazine for the components disposed in a position at one side of the path, and means operable to transfer the components from the magazine transversely of the path and locate the components in their respective apertures of the strip and their groups of leads resting on top of the strip.

2. An apparatus for loading components according to claim 1 in which a spreader is operable to space the leads for each component at predetermined positions relative to each other on top of the strip.

3. An apparatus for loading components according to claim 2 in which a tape dispenser is operable to lay a tape longitudinally of the strip and transversely of portions of the spaced leads.

4. An apparatus for loading components according to claim 3 in which a heating unit is spaced normally from the path, and means operable to move the heating unit under force to seal the tape to the strip.

5. An apparatus for loading components according to claim 4 in which cutaway portions of the heating unit straddle the leads so that only portions of the tape on opposing sides of the leads will be sealed to the strip.

6. An apparatus for loading components according to claim 1 in which the transferring means includes a chuck adapted to receive the component, and means to impart movements to the chuck to cause it to receive the component from the magazine, move the component transversely of the path to position the leads on top of the strip and move the component into the aperture.

7. An apparatus for loading components according to claim 2 in which the transferring means includes a chuck adapted to receive the component, and means to move the chuck through an operating cycle from a starting position to a position adjacent the magazine where it will receive the component, then transversely of the path to locate the leads on top of the strip, then in another direction to locate the component in the aperture and against a surface thereof, hold the component during spacing of the leads, releasing the component and returning to the starting position.

8. An apparatus for loading components according to claim 1 in which the advancing means for the strip includes a rotatable drum supported relative to the path, spaced projections on the periphery of the drum receivable in apertures of the strip to connect the strip to the drum, and means to impart like intermittent rotary motions to the drum to advance the strip the like distances.

9. An apparatus for loading components having groups of leads extending from like ends thereof on a dielectric strip comprising means to advance the strip longitudinally in a given path intermittently like distances between intervals of rest, a perforating station disposed adjacent the path and including an operable perforating unit, means to operate the unit to punch series of apertures in like portions of given lengths in the strip during the intervals of rest, a component supply including trays of equally spaced components located successively at a feeding station relative to the path, and means operable to transfer successive groups of components from their tray across the path and locate each component of each group in their respective apertures and position the leads of the components on their respective like portions of the strip.

10. An apparatus for loading components having groups of leads extending from like ends thereof on a dielectric strip, comprising means to advance the strip longitudinally in a given path intermittently like distances between intervals of rest; a perforating station disposed adjacent the path and including an operable perforating unit; means to operate the unit to punch series of apertures in like portions of given lengths in the strip during the intervals of rest; a component supply including trays of equally spaced components located successively at a feeding station relative to the path; means operable to transfer successive groups of components from their tray across the path and locate each component of each group in their respective apertures and position the leads of the components on their respective like portions of the strip, the transfer means including a carriage supported for movement relative to the feeding station, a plurality of spaced chucks for the components of each group mounted on the carriage, and means to move the carriage to cause the chucks to engage their respective components of each group and remove them successively from the trays.

11. An apparatus for loading components according to claim 9 in which the transfer means includes a carriage movable through successive cycles, and a plurality of suction cups mounted at spaced positions on the carriage and adapted to receive and remove their respective components of each group from the trays during each cycle of movement of the carriage.

12. An apparatus for loading components according to claim 11 in which the carriage has a supporting roller, and a support for the roller having interconnected surfaces at different levels so that during movements of the carriage in one direction, one of the surfaces will cause guiding of the suction cups into registration with their respective components of each group of components and during movement of the carriage in another direction, the other surface will position the components in their respective apertures.

13. An apparatus for loading components according to claim 12 in which the apertures in which the components are disposed have like inner surfaces, and a drive means for the carriage operable to impart the movements to the carriage and to hold the components against their inner surfaces.

14. An apparatus for loading components according to claim 11 in which a drive means moves the carriage through an operating cycle including an intermediate lead cutting interval when the components are held in the chucks, and means operated during said interval to cut excess lengths from the leads.

15. An apparatus for loading components according to claim 11 in which a drive means moves the carriage through an operating cycle including an intermediate lead spreading interval when the components are held by the chucks in their apertures, and means operable during this interval to spread the leads like distances from each other.

16. An apparatus for loading components according to claim 9 in which the transfer means includes a carriage supported for movement relative to the feeding station, a suction head mounted on the carriage, a plurality of suction cups supported in communication with the suction head and spaced to receive groups of components successively from the trays, and means to move the carriage through an operating cycle to cause the suction cups to receive their successive groups of components, remove them from the trays and place them on their respective portions of the strip.

17. An apparatus for loading components according to claim 16 in which a suction means is adapted for connection through a passageway to the suction head to create a suction in the suction head and the suction cups, and means alternately actuable to connect the passageway with the suction means and the atmosphere at predetermined intervals during the operating cycle of the carriage.

18. An apparatus for loading components according to claim 10 in which there are a plurality of groups of components in each tray, and means to move the successive trays longitudinally given distances to locate the successive groups of components in alignment with their chucks.

19. An apparatus for loading components according to claim 10 in which there are a plurality of groups of components in each tray, a unit operable at the feeding station to move each tray in the feeding station longitudinally to align the groups of components successively with the chucks, and means responsive to the movement of the carriage to operate the unit.

20. An apparatus for loading components having groups of leads extending from like ends thereof on a dielectric strip, comprising means to advance the strip longitudinally in a given path intermittently like distances between intervals of rest; a perforating station disposed adjacent the path and including an operable perforating unit; means to operate the unit to punch series of apertures in like portions of given lengths in the strip during the intervals of rest; a component supply including trays of equally spaced components located successively at a feeding station relative to the path, the component supply further including a hollow magazine adapted to support a plurality of the trays in stacked formation therein adjacent the feeding station, a support for the stack of trays movable into the magazine, and means to move the support to move the trays successively into the feeding station; and means operable to transfer successive groups of components from their tray across the path and locate each component of each group in their respective apertures and position the leads of the components on their respective like portions of the strip.

21. An apparatus for loading components according to claim 20 in which a lock is actuable to hold all of the trays in the magazine with the exception of the tray in the feeding station against movement until said tray in the feeding station has been emptied and moved out of the feeding station.

22. An apparatus for loading components according to claim 21 in which a unit is actuable to move the emptied tray out of the feeding station.

23. An apparatus for loading components according to claim 21 in which a unit is actuable to move successive emptied trays from the feeding station into a reloading station.

24. An apparatus for loading components according to claim 23 in which a hollow magazine is disposed at the reloading station, a support for successive empty trays moved into the reload station, and means to lower the support a given distance in advance of each empty tray to cause the empty trays to be stacked on the support therefor.

25. An apparatus for loading components according to claim 24 in which a lock is actuable to hold all the empty trays on the support therefor against upward movement and ready to receive the next empty tray.

26. An apparatus for loading components according to claim 24 in which an auxiliary unit is operable to engage each empty tray disposed on the support therefor and force it downwardly a distance of at least the thickness of each tray.

27. An apparatus for loading components according to claim 10 in which the component supply includes a conveyor having a plurality of hollow supports, magazines adapted to support stacks of the trays removably mounted on the supports, and means actuable to move the conveyor intermittently to locate a magazine, which has been emptied at the feeding station, at a reloading station to receive trays from the next magazine as they are emptied at the feeding station.

28. An apparatus for loading components acording to claim 27 in which an element is positioned normally beneath the feeding station free of the hollow supports, and a unit operable at predetermined intervals to move the element through the hollow support to move a stack of loaded trays upwardly in the magazine to intermittently locate a loaded tray in the feeding station.

29. An apparatus for loading components according to claim 28 in which a guide for empty trays is disposed between the feeding station and the reload station, and a transporting unit operable to move the empty trays successively from the feeding station to the reloading station.

30. An apparatus for loading components according to claim 27 in which an element is positioned normally beneath the reloading station free of the hollow supports, and a unit operable initially to move the element upwardly through the support and the empty magazine to receive the first emptied tray and operable subsequently to move the element downwardly to recive in stacked formation the subsequent empty trays.

31. An apparatus for loading components having groups of leads extending from like ends thereof on a dielectric strip, comprising means to advance the strip longitudinally in a given path intermittently like distances between intervals of rest; a perforating station disposed adjacent the path and including an operable perforating unit; means to operate the unit to punch series of apertures in like portions of given lengths in the strip during the intervals of rest; a component supply including trays of equally spaced components located successively at a feeding station relative to the path; means operable to transfer successive groups of components from their tray across the path and locate each component of each group in their respective apertures and position the leads of the components on their respective like portions of the strip; and a lead spacing unit movable through an operating cycle to engage the leads of all components in each group successively and space them like distances apart on their like portions of the strip.

32. An apparatus for loading components according to claim 31 in which the spacing unit includes a carriage, a shaft rotatably supported by the carriage, like rollers fixedly mounted at spaced positions on the shaft and having aligned notches in their peripheries providing starting edges and finishing edges with peripheral grooves closely positioned at the starting edges to receive their respecive leads adjacent their components and at wider spaced positions at the finishing edges to cause like spacing of the leads during rolling of the rollers laterally of the strip.

33. An apparatus for loading components according to claim 32 in which means supporting the spacing unit is operable to lower the unit to position the starting edges of the rollers adjacent the components, means subsequently operable to move the carriage laterally in one direction from a starting position to move the rollers laterally of the strip, and means operable during movement in the one direction to rotate the shaft to cause the rollers to rotate on the strip to the finishing edges.

34. An apparatus for loading components according to claim 33 in which the supporting means is subsequently operable to raise the unit free of the strip, and the carriage moving means is subsequently operable to return the carriage to its starting position and cause rotation of the shaft to return the rollers to their starting positions.

35. An apparatus for loading components according to claim 9 in which means is operable to locate the leads of the components at like spaced positions on the strip, a tape shuttle supported for movement between starting and forward positions, the tape shuttle including a support for a supply of tape, a leading end of which is secured to the strip in advance of the leads, and means to move the tape shuttle to the forward position to cause a length of the tape to be placed over the spaced leads of a group of components.

36. An apparatus for loading components according to claim 35 in which a heating element is supported by the shuttle at a position spaced from the strip and is provided with recesses aligned with the spaced leads, and means adapted to move the heating element into engagement with the length of tape to seal it to the strip at opposing sides of the leads.

37. An apparatus for loading components according to claim 36 in which a unit is oprable to cause the tape shuttle to return to its starting position during advancement of the strip.

38. An apparatus for loading components according to claim 36 in which a unit is operable to cause the tape shuttle and extending from the supply to a position adjacent the strip to substantially lay the tape over the spaced leads.

39. An apparatus for loading components according to claim 9 in which means is operable to locate the leads of the components at like spaced positions on the strip, a tape shuttle supported for movement between a starting position and a forward position, the tape shuttle including a plurality of tape supplies leading ends of which are secured at spaced positions to the strip in advance of the leads, means to move the tape shuttle to the forward position to cause lengths of the tapes to be placed over the spaced leads of the group of components, heating elements for the tapes carried by the tape shuttle and movable therewith, and means operable to force the heating elements against their lengths of tape to seal them to the strip.

40. An apparatus for loading components according to claim 35 in which the transfer means includes a carriage with individual chucks for the components of the group, and means to move the carriage to cause the chucks to transfer the group of components to the strip and hold the components against displacement in their apertures during spacing of the leads and placing of the tape.

41. An apparatus for loading components according to claim 36 in which the transfer means includes a carriage with individual chucks for the components of the group, and means to move the carriage to cause the chucks to hold the group of components against displacement in their apertures during spacing of the leads, placing of the tape thereon and sealing of the tape to the strip.

References Cited by the Examiner
UNITED STATES PATENTS

| | | | |
|---|---|---|---|
| 2,280,573 | 4/42 | Flaws | 53—28 |
| 2,565,753 | 8/51 | Botwinick | 156—514 |
| 2,771,206 | 11/56 | Daniels et al. | 156—464 |
| 2,929,130 | 3/60 | Packman | 29—52 |

EARL M. BERGERT, *Primary Examiner.*